US010317863B2

(12) United States Patent
Papadopoulos

(10) Patent No.: US 10,317,863 B2
(45) Date of Patent: Jun. 11, 2019

(54) HVAC AND BUILDING MANAGEMENT SYSTEM WITH DECONSTRUCTED MEDIA FLOW GRAPHICAL USER INTERFACE

(71) Applicant: Johnson Controls Technology Company, Holland, MI (US)

(72) Inventor: Dimitrios S. Papadopoulos, Westwood, NJ (US)

(73) Assignee: Johnson Controls Technology Company, Auburn Hills, MI (US)

( * ) Notice: Subject to any disclaimer, the term of this patent is extended or adjusted under 35 U.S.C. 154(b) by 286 days.

(21) Appl. No.: 15/047,601

(22) Filed: Feb. 18, 2016

(65) Prior Publication Data

US 2017/0242411 A1    Aug. 24, 2017

(51) Int. Cl.
| | |
|---|---|
| *G06Q 50/06* | (2012.01) |
| *G05B 15/02* | (2006.01) |
| *F24F 3/044* | (2006.01) |
| *F24F 11/30* | (2018.01) |
| *F24F 11/62* | (2018.01) |
| *F24F 11/56* | (2018.01) |
| *F24F 11/52* | (2018.01) |

(52) U.S. Cl.
CPC ............. *G05B 15/02* (2013.01); *F24F 3/044* (2013.01); *F24F 11/30* (2018.01); *F24F 11/62* (2018.01); *F24F 11/52* (2018.01); *F24F 11/56* (2018.01); *G05B 2219/2614* (2013.01)

(58) Field of Classification Search
CPC ..... G05B 17/02; G06Q 50/06; Y02B 70/3241
See application file for complete search history.

(56) References Cited

U.S. PATENT DOCUMENTS

| | | |
|---|---|---|
| D629,410 S | 12/2010 | Ray et al. |
| D637,196 S | 5/2011 | Ray et al. |
| D637,197 S | 5/2011 | Ray et al. |
| D695,757 S | 12/2013 | Ray et al. |
| D696,263 S | 12/2013 | Ray et al. |
| 2010/0058248 A1 | 3/2010 | Park |

OTHER PUBLICATIONS

U.S. Appl. No. 29/345,221, filed Oct. 12, 2009, Herman et al.
U.S. Appl. No. 29/383,934, filed Jan. 24, 2011, Ray et al.
U.S. Appl. No. 29/487,827, filed Apr. 11, 2014, Johnson Controls Technology Company.
U.S. Appl. No. 29/515,801, filed Jan. 27, 2015, Johnson Controls Technology Company.
U.S. Appl. No. 61/250,819, filed Oct. 12, 2009, Asp et al.

*Primary Examiner* — Thomas L Dickey
(74) *Attorney, Agent, or Firm* — Foley & Lardner LLP

(57) ABSTRACT

A building management system includes a database and a controller. The database stores data points, and the controller receives a selection of a control group defining a process variable. The controller further identifies a plurality of components of the building management system that operate to affect the process variable, and identifies a temporal order in which the identified components affect the process variable. The controller obtains data points associated with each of the identified components, and generates a graphical user interface that displays the obtained data points arranged in the temporal order.

21 Claims, 13 Drawing Sheets

HVAC AND BUILDING MANAGEMENT SYSTEM WITH DECONSTRUCTED MEDIA FLOW GRAPHICAL USER INTERFACE

BACKGROUND

The present disclosure relates generally to graphical user interfaces for managing building systems. The present disclosure relates more particularly to systems and methods for providing a deconstructed graphical user interface for a heating, ventilating, and air conditioning (HVAC) system.

A building management system (BMS) is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof. The typical interface provided for monitoring and controlling a BMS can be non-intuitive and difficult to use.

Some conventional BMS interfaces provide a user with a graphical representation of the system or component selected. However, finding information quickly can be challenging due to the manner in which information is presented in conventional BMS interfaces. It would be desirable to provide graphical user interface that is intuitive, easy to use, and overcomes the disadvantages of conventional BMS interfaces.

SUMMARY

One implementation of the present disclosure is a building management system including a database that stores data points and a controller. The controller receives a selection of a control group defining a process variable, identifies a plurality of components of the building management system that operate to affect the process variable, identifies a temporal order in which the identified components affect the process variable, and obtains data points associated with each of the identified components. The controller then generates a graphical user interface that displays the obtained data points arranged in the temporal order.

In some embodiments, the controller includes a processing circuit that generates trend graphics for trend data relevant to the selected control group prior to the trend graphics being requested by a user.

In some embodiments, the graphical user interface displays a process variable associated with the selected control group and at least one of: one or more setpoints, a warning, and an alarm. In some embodiments, the graphical user interface displays a dynamic indicator of the process variable.

In some embodiments, the processing circuit compares the building data to predetermined threshold values to assign ranges to the building data and stores the assigned ranges in the database. The graphical user interface may display the assigned ranges on the dynamic indicator.

In some embodiments, the controller compares the building data to predetermined threshold values to assign colors associated with the assigned ranges to the building data and stores the assigned colors in the database. The graphical user interface may display the assigned colors on the dynamic indicator.

In some embodiments, the graphical user interface receives input from a user for transmission to the controller. In some embodiments, the graphical user interface includes an interface option for allowing a user to reverse the temporal order in which the obtained data points are displayed.

Another implementation of the present disclosure is a method for controlling a building management system including a database that stores data points and a controller. The method includes receiving a selection of a control group defining a process variable, identifying a plurality of components of the building management system that operate to affect the process variable, identifying a temporal order in which the identified components affect the process variable, and obtaining data points associated with each of the identified components. The method includes generating a graphical user interface that displays the obtained data points arranged in the temporal order.

In some embodiments, the method includes generating trend graphics for trend data relevant to the selected controls group prior to the trend graphics being requested by a user.

In some embodiments, the graphical user interface generated by the method displays a process variable associated with the selected controls group and at least one of: one or more setpoints, a warning, and an alarm. In some embodiments, the graphical user interface generated by the method displays a dynamic indicator of the process variable.

In some embodiments, the method includes comparing the building data to predetermined threshold values to assign ranges to the building data and storing the assigned ranges in the database. The graphical user interface may display the assigned ranges on the dynamic indicator.

In some embodiments, the method includes comparing the building data to predetermined threshold values to assign colors associated with the assigned ranges to the building data and storing the assigned colors in the database. The graphical user interface may display the assigned colors on the dynamic indicator.

In some embodiments, the graphical user interface generated by the method receives input from a user for transmission to the controller. In some embodiments, the graphical user interface includes an interface option for allowing a user to reverse the temporal order in which the obtained data points are displayed.

Yet another implementation of the present disclosure is a controller in a building management system. The controller receives a selection of a control group defining a process variable, identifies a plurality of components of the building management system that operate to affect the process variable, identifies a temporal order in which the identified components affect the process variable, obtains data points associated with each of the identified components, and generates a graphical user interface that displays the obtained data points arranged in the temporal order.

In some embodiments, the controller generates trend graphics for trend data relevant to the selected controls group prior to the trend graphics being requested by a user. In some embodiments, the trend data includes multiple trend graphs. The graphs may be aligned with each other and may share a common axis (e.g., a shared x-axis or y-axis). One of the graphs may display present value and setpoint(s) for the process variable and may use various colors to display indications of warnings and alarms. Another of the graphs may display controlled outputs and may use various colors to indicate status and output type. In some embodiments, the graphical user interface displays a process variable associated with the selected controls group and at least one of: one or more setpoints, a warning, and an alarm. In some embodiments, the graphical user interface receives input from a user for transmission to the controller.

Those skilled in the art will appreciate that the summary is illustrative only and is not intended to be in any way limiting. Other aspects, features, and advantages of the devices and/or processes described herein, as defined solely by the claims, will become apparent in the detailed description set forth herein and taken in conjunction with the accompanying drawings.

DETAILED DESCRIPTION

Overview

Figure 1:
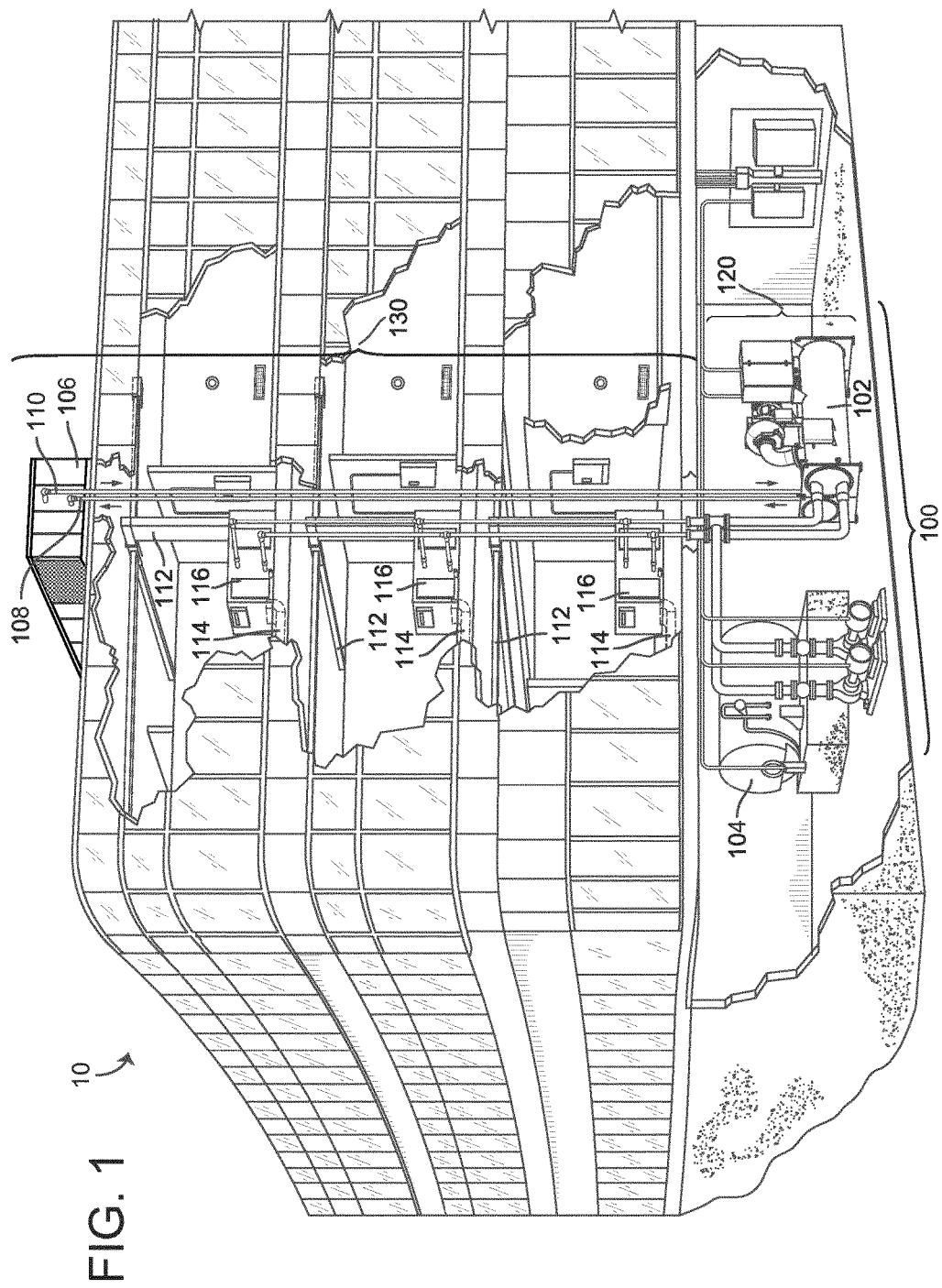
FIG. 1 is a drawing of a building equipped with an HVAC system in which the systems and method of the present disclosure may be implemented, according to an exemplary embodiment.

Referring generally to the FIGURES, a building management system, deconstructed graphical user interface, and components thereof are shown according to various exemplary embodiments. Currently, a gap exists between software development and HVAC system knowledge within the industry. Innovation within the industry is slow, and the industry as a whole tends to move slowly. The proliferation of mobile use has increased the availability of building system information on mobile devices, but mobile interfaces and applications lack the ability to provide raw data with the information necessary to troubleshoot and solve issues efficiently. In many implementations, the raw data is being provided for the purpose of providing the cohesive report.

HVAC flow type graphics have not changed in decades. Many of the conventional interfaces still used are based on interfaces etched on control panels which house the pneumatics and switches that provide control over the systems. The advancements made in building and HVAC system controls have rendered current graphics arcane. The systems and methods described herein reduce the time necessary for a building operator to process data necessary for troubleshooting and solving issues in a building. The minimal and focused presentation of the building data reduces the time necessary for a controls system provider to develop graphical displays. The graphical user interface described in the present disclosure may be accessed on a mobile device, through a device application, or a web application and browser interface, etc.

The deconstructed graphical user interface of the present disclosure provides a solution to the inefficient and ineffectual traditional HVAC control interface. The deconstructed graphic may separate field points by the way they are controlled by the system. For example, a VAV box system may have the following control groupings: temperature, flow, air quality, etc. The control groups may contain only the field points that are related to their particular control. In some embodiments, the control groups may contain fields points which are not related to their particular control. In such cases, the unrelated field points may be hidden or may appear farther down on the list. Furthermore, the order will be provided based on media flow direction; a user may select whether to view in forward or reverse flow direction.

In a conventional HVAC graphic, a user's eyes may follow the air flow within the ductwork past dampers, valves, sensors, etc. Then his eyes may jump to field points such as setpoints and modes of operation to get the full picture. A deconstructed graphic would provide those points in a list type order, in a top-down approach (as if he was looking upstream or downstream through the ductwork. Similar view may be provided based on water flow. The control group may also include associated alternate system points related (as available) to the type of control being viewed. For example, when viewing the temperature control of a VAV box system graphic, its associated air handling system supply fan status, discharge air temperature, discharge air temperature setpoint, etc. may be shown in the appropriate order in the list. Additional features and advantages of the deconstructed graphical user interface are described in greater detail below.

Building Management System and HVAC System

Referring now to FIGS. 1-4, an exemplary building management system (BMS) and HVAC system in which the systems and methods of the present disclosure may be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, an HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., boilers, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units or AHUs 116. For example, airside system 130 is shown to include a separate AHU 116 on each floor or zone of building 10. AHUs 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate AHUs 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
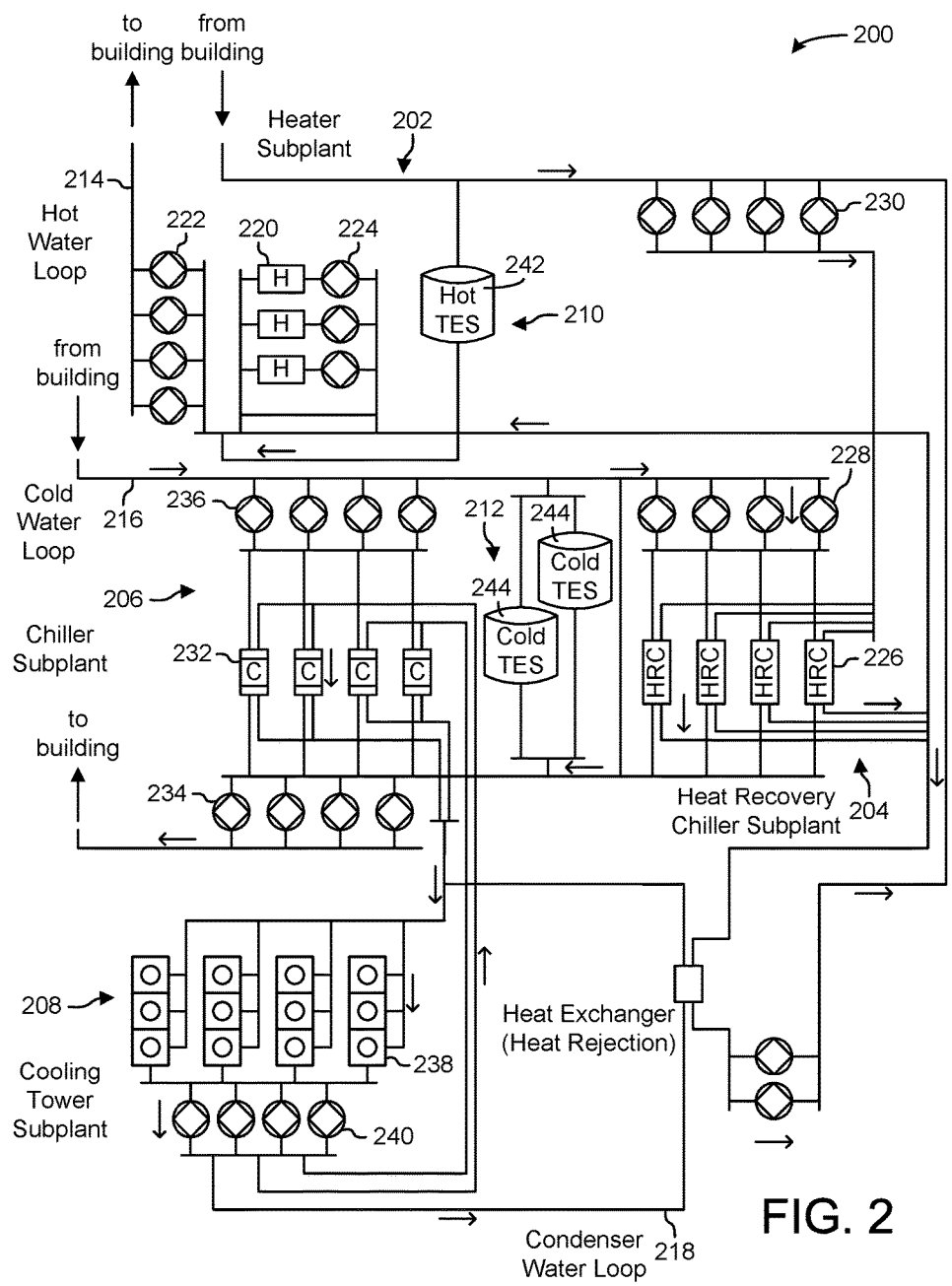
FIG. 2 is a block diagram of a waterside system which may be used in conjunction with the HVAC system of FIG. 1, according to an exemplary embodiment.

Referring now to FIG. 2, a block diagram of a waterside system 200 is shown, according to an exemplary embodiment. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 and building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., AHUs 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, ammonia, refrigerant, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps in waterside system 200. In various embodiments, waterside system 200 may include more, fewer, or different types of devices and/or subplants based on the particular configuration of waterside system 200 and the types of loads served by waterside system 200.

Figure 3:
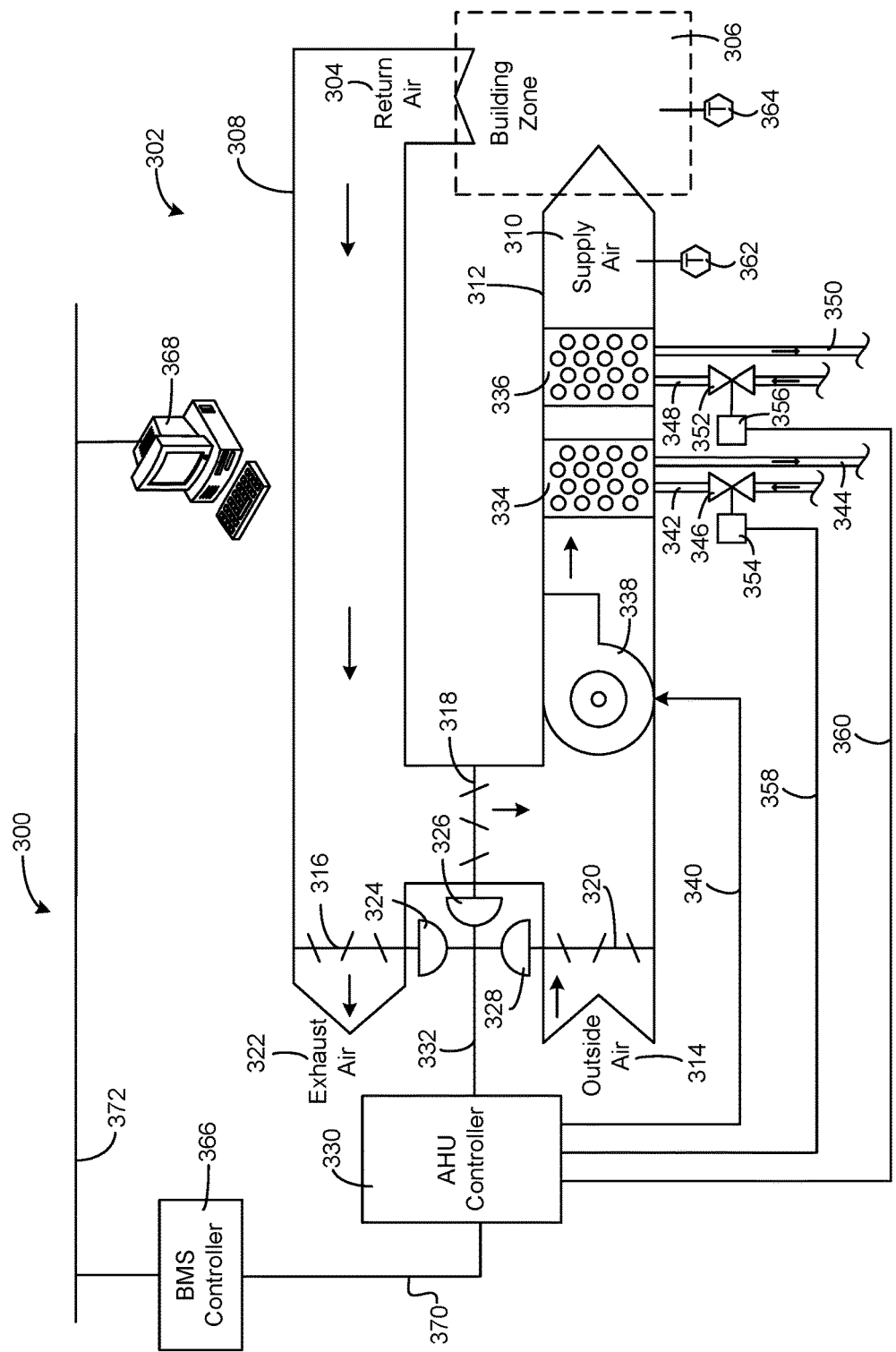
FIG. 3 is a block diagram of an airside system which may be used in conjunction with the HVAC system of FIG. 1, according to an exemplary embodiment.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units, AHUs 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form mixed air. The mixed air is subsequently heated by heating coil 336 or cooled by cooling coil 334 and supplied to building zone 306 as supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324, 326, and 328 may communicate with an AHU controller 330 via a communications link 332. Actuators 324, 326, and 328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324, 326, and 328), status information, commissioning information, configuration settings, calibration data, and/or other types of information or data that may be collected, stored, or used by actuators 324, 326, and 328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324, 326, and 328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and heating coil 336 and provide supply air 310 to building zone 306. AHU controller 330 may communicate with fan 338 via communications link 340 to control a flow rate of supply air 310. In some embodiments, AHU controller 330 controls air pressure and/or airflow within the system by modulating a speed of fan 338. AHU controller 330 may then perform temperature control by modulating dampers 316, 318, and 320, cooling coil 334, and/or heating coil 336.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
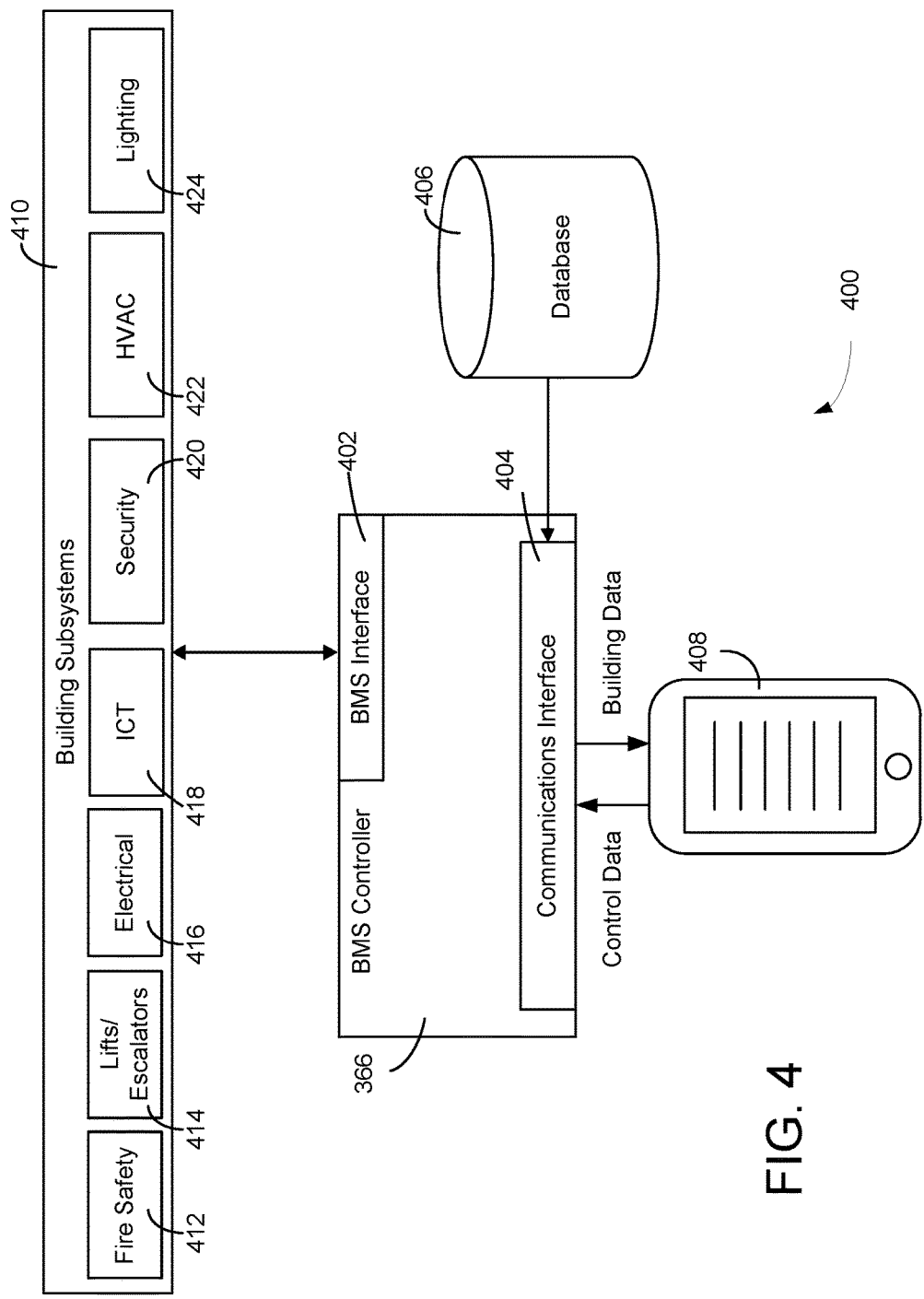
FIG. 4 is a block diagram of a building management system in which the systems and methods of the present disclosure may be implemented, according to an exemplary embodiment.

Referring now to FIG. 4, a block diagram of a building management system (BMS) 400 is shown, according to an exemplary embodiment. BMS 400 may be implemented in building 10 to automatically monitor and control various building functions. BMS 400 is shown to include BMS controller 366 and a plurality of building subsystems 410. Building subsystems 410 are shown to include a building electrical subsystem 416, an information communication technology (ICT) subsystem 418, a security subsystem 420, a HVAC subsystem 422, a lighting subsystem 424, a lift/escalators subsystem 414, and a fire safety subsystem 412. In various embodiments, building subsystems 410 can include fewer, additional, or alternative subsystems. For example, building subsystems 410 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 410 include waterside system 200 and/or airside system 300, as described with reference to FIGS. 2-3.

Each of building subsystems 410 may include any number of devices, controllers, and connections for completing its individual functions and control activities. HVAC subsystem 422 may include many of the same components as HVAC system 100, as described with reference to FIGS. 1-3. For example, HVAC subsystem 422 may include a chiller, a boiler, any number of air handling units, economizers, field controllers, supervisory controllers, actuators, temperature sensors, and other devices for controlling the temperature, humidity, airflow, or other variable conditions within building 10. Lighting subsystem 424 may include any number of light fixtures, ballasts, lighting sensors, dimmers, or other devices configured to controllably adjust the amount of light provided to a building space. Security subsystem 420 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 404 and a BMS interface 402. Interface 404 may facilitate communications between BMS controller 366 and external applications (e.g., monitoring and reporting applications, enterprise control applications, remote systems and applications, applications residing on client devices, etc.) for allowing user control, monitoring, and adjustment to BMS controller 366 and/or subsystems 410. Interface 404 may also facilitate communications between BMS controller 366 and client devices 448. BMS interface 402 may facilitate communications between BMS controller 366 and building subsystems 410 (e.g., HVAC, lighting security, lifts, power distribution, business, etc.).

Interfaces 402 and 404 can be or include wired or wireless communications interfaces (e.g., jacks, antennas, transmitters, receivers, transceivers, wire terminals, etc.) for conducting data communications with building subsystems 410 or other external systems or devices. In various embodiments, communications via interfaces 402 and 404 may be direct (e.g., local wired or wireless communications) or via a communications network (e.g., a WAN, the Internet, a cellular network, etc.). For example, interfaces 402 and 404 can include an Ethernet card and port for sending and receiving data via an Ethernet-based communications link or network. In another example, interfaces 402 and 404 can include a WiFi transceiver for communicating via a wireless communications network. In another example, one or both of interfaces 402 and 404 may include cellular or mobile phone communications transceivers. In one embodiment, communications interface 404 is a power line communications interface and BMS interface 402 is an Ethernet interface. In other embodiments, both communications interface 404 and BMS interface 402 are Ethernet interfaces or are the same Ethernet interface.

BMS controller 366 may communicate with personal electronic device 408. In some embodiments, device 408 may be a smartphone or tablet. In other embodiments, device 408 may be a laptop or desktop computer. Personal electronic device 408 may be any device which is capable of communication with BMS controller 366 through communications interface 404, and is not limited to the explicitly enumerated devices. It is contemplated that electronic device 408 may communicate with building subsystems 410 directly. BMS controller 366 may transmit building data to device 408 for processing or analysis. Building data may include any relevant data obtained from a component within the building or pertaining to a portion or subsystem of the building. For example, building data may be data from sensors, status control signals, feedback signals from a device, calculated metrics, setpoints, configuration parameters, etc. In some implementations, building data is derived from data collected.

Still referring to FIG. 4, personal electronic device 408 may transmit control data to BMS controller 366. Control data may be any data which affects operation of the BMS. In some embodiments, control data may control building subsystems 410 through BMS controller 366. For example, personal electronic device 408 may send a signal with a command to enable intrusion detection devices of security subsystem 420. Personal electronic device 408 may receive building data from BMS controller 366 through communications interface 404.

Deconstructed Graphical User Interface

As discussed briefly above, a gap currently exists between software development and HVAC system knowledge within the industry. Innovation within the industry is slow, and the industry as a whole tends to move slowly. The proliferation of mobile use has increased the availability of building system information on mobile devices, but mobile interfaces and applications lack the ability to provide raw data with the information necessary to troubleshoot and solve issues efficiently. In many implementations, the raw data is being provided for the purpose of providing the cohesive report.

HVAC flow type graphics have not changed in decades—many of the conventional interfaces still used are based on interfaces etched on control panels which house the pneumatics and switches that provide control over the systems. The advancements made in building and HVAC system controls have rendered current graphics arcane. The proposed systems and methods reduce the time necessary for a building operator to process data necessary for troubleshooting and solving issues in a building. The systems and methods described herein may automatically create a graphical user interface which includes a minimal and focused presentation of the building data. Automatically creating the graphical user interface eliminates or reduces the time necessary for a controls system provider to develop graphical displays. The graphical user interface described in the present disclosure may be accessed on a mobile device, via a device application, through a web application and browser interface, etc.

A library of control groups, or collections of building system components which operate to affect a certain process variable, for various types of building systems is created. This library may consist of tags and descriptions of field points using open source tagging methods and/or proprietary tags (when otherwise not available). The library may also include the proper media flow order which the deconstructed graphic will display. A media flow order may be the order in which a medium such as water or air passes through a set of components. For example, for a variable air volume (VAV) system, the media flow order stored in the library may be from the air handling unit (AHU), to the damper, to the reheat coil, to the zone being controlled.

The first time a deconstructed graphic display interacts with data from a building system, the system attempts to match the data to an available library item. The system may display the closest match to a deconstructed graphic within the system. In some implementations, the system will automatically select the closest match as the graphic to display. The system may give the end user the ability to choose another graphic at a later time. In some embodiments, the system may store the chosen graphic as the new closest match for the given data. For example, if the system receives building data which it has never processed before, a user may be given the option to select a closest match which will be presented automatically the next time a corresponding set of data is received. In some implementations, the user may be given the option to input a new graphic or order to be stored as the closest match.

The deconstructed graphic displays information as defined by the library. As a general rule, the deconstructed graphic is separated into groups based on changes to process variables being applied to the building system that is being displayed. Common groups of controls might include process variables such as temperature, pressure, flow, humidification, dehumidification, air quality, and others.

There may be a common layout for each control group. For example, a single duct VAV box system may be used to describe the layout of a portion of an HVAC system which is associated with the temperature process variable. Each control group may be associated with a particular process variable. For example, the temperature control group may be associated with the zone air temperature process variable. In some implementations, each control group may be associated with multiple process variables. Control groups are also associated with multiple output devices which may be controlled by the value of the process variable. In some implementations, changes to the process variable may affect changes in the other output devices, just as changes to the output devices may affect changes in the process variable.

For temperature control, the process variable may be the zone air temperature or ZN-T. The ZN-T is controlled within the effective cooling and heating setpoints or EFFCLG-SP and EFFHTG-SP respectively. For example, the EFFCLG-SP may be 66° F. and the EFFHTG-SP may be 80° F. The ZN-T may be controlled to be any temperature between the setpoints. In some implementations, a stopping condition may be in place to prevent a user from setting the ZN-T to a temperature outside of the setpoints. The system may issue an alarm or alert the user that their selected temperature is outside of the acceptable extrema. The value of the ZN-T may control the settings and control strategies for each of the output devices associated with the selected control group. As such, near the top of the graphical display, the current value for the ZN-T may be emphasized using a larger font than the rest. The background color behind the value would correspond to the ZN-T status (e.g. if the ZN-T was in the alarm state, the background color would be red).

A button icon may be displayed which launches a trend viewer; the trend view may automatically show only trends from the selected control group. The trend viewer may be broken up into two to three sections which are aligned with each other with respect to time and show parent system(s), controlled sensors/setpoints, and outputs, respectively. For example, the trend viewer for the temperature control group may show zone air temperature, the EFFCLG-SP, and the EFFHTG-SP over time. In some implementations, the different trends may be shown on the same graph. For example, zone air temperature, the EFFCLG-SP, and the EFFHTG-SP may be shown over time and overlain on the same graph, which may show whether the process variable is currently being controlled.

Above the process variable in the deconstructed graphic, a graphical representation of the process variable range may be displayed. There may be multiple ranges depicted, including setpoints(s) differentials, warning limits, alarm limits, and high/low limits. A dynamic indicator may display the current value against the ranges mentioned above. For example, a dynamic indictor for the temperature process variable may show a temperature range on which sections have been denoted. Certain portions of the range may be marked as warning areas, past which the temperature process variable may issue a warning or simply be put in a warning state. The dynamic indicator may display thresholds for alarms associated with the process variable. For example, if the temperature exceeded an alarm limit such as 77° F., the system may trigger an alarm, which may not be dismissed until the temperature falls below the alarm limit and a configured differential. In some embodiments, a user with the proper credentials may dismiss the alarm. Occupancy of the zone in which the alarm has been triggered may determine whether the alarm may be dismissed. For example, if the zone is occupied, a user may not be able to dismiss the alarm, despite having sufficient privileges. If the zone is unoccupied, required authorization levels may be lowered for a user to dismiss or alter the alarm state. For example, if there is no one in a zone in which an alarm has been triggered, a user with the base level of authorization may be able to de-escalate the alarm.

Any modifiable setpoints may be displayed directly below the process variable. Setpoints may be modified simply by making selections with buttons or by typing in a value. For example, a user may increase a setpoint by pressing a button associated with increasing the value of the selected variable or decrease a setpoint by pressing a button associated with decreasing the value of the selected variable. A user may change a setpoint by typing in a different value for the selected variable. Setpoints may be modified by other forms of input, and the methods of changing setpoints are not limited to those explicitly enumerated.

Common information regarding occupancy and mode of operation may be displayed underneath the associated setpoint or setpoints. Occupancy and mode of operation information may be shown via icon or text or a combination of the two. Occupancy information may inform a user whether there are people within the selected area or zone, or may provide more detailed information such as how many, or which people are within the zone. For example, occupancy information may be provided in the form of a graphic of three people, one of which is a different color because that person has administrative privileges. Occupancy and mode of operation can be viewed and adjusted via the graphical user interface. For example, the interface may not only display an occupancy status (e.g., indicated by an icon) but also allow a user to adjust or set the desired occupancy (e.g., by providing a command or input via the user interface). In some implementations, alarms and controls decisions regarding areas having occupancy or persons with varying authorization levels may be affected by the occupancy.

The mode of operation in which the system is currently operating may assist a user in determining whether the data being presented to him indicates that there is a malfunction. For instance, if the mode of operation is displayed as a snowflake (which may represent cooling), and the temperature is increasing, a user may decide that a malfunction has occurred. In some embodiments, a user may be able to view a trend page which displays the historical data associated with the selected control group and process variable. For example, a user may be able to view the historical temperature of the zone and see that despite operating on heating mode, the temperature of the zone has been steadily decreasing. A user may then make the determination that a component of the control group has failed, and may be able to identify the relevant component.

In some embodiments, the graphical display may be presented as separate portions. In some embodiments, a list of field points related to the process variable may be provided in media flow order. Media flow order may be the order in which a user may define her preference for forward or reverse flow. The forward flow order may be set as the default, and the system may automatically retrieve information from parent systems (as available and defined in the library related to the control group being viewed) in the forward or reverse flow order for display to a user.

For example, a VAV box system may be served by an AHU. Since the air flow from the AHU provides cooling to the VAV box system, the list of field points may begin with a short list of associated AHU field points. Points such as supply fan status and discharge air temperature might be the first two items on the list. List items may consist of an icon representing the type of field point, the name of the system, the name of the field point, and the current value of the field point. In some embodiments, the list items may be displayed in a subdued color. Color changes in the icon and the background of the value of the field point may change dynamically based on the status of the field point it represents. For example, if the VAV system's box heating output is overridden, the background of the icon and the background of the current value of the field point may appear in orange. A user may be able to globally select a different color; in some embodiments, a user may select a different color for any of a number of statuses and alarms. The system may automatically select a color to be associated with each status, and in some implementations, may calculate a color based on a range in which the current value falls. For example, the system may select colors on a gradient from green to red for current values of field points such that values in a desirable range may be displayed in green, and values in undesirable ranges may be displayed in colors which are progressively more red.

The list of field points may continue to display other points after the associated parent field points. For example, the cooling output and box heating output might be the next items on the list after supply fan status and discharge air temperature. In some implementations, cooling output is listed rather than damper output because damper output may not be associated with the temperature control group. The damper may typically be associated with the flow control group, and in some embodiments may not be used as an indication of temperature control. Such relational intricacies between system components may be handled by the library. It is contemplated that such a library would be developed in close collaboration with HVAC specialists.

Building Management System Controller

Figure 5:
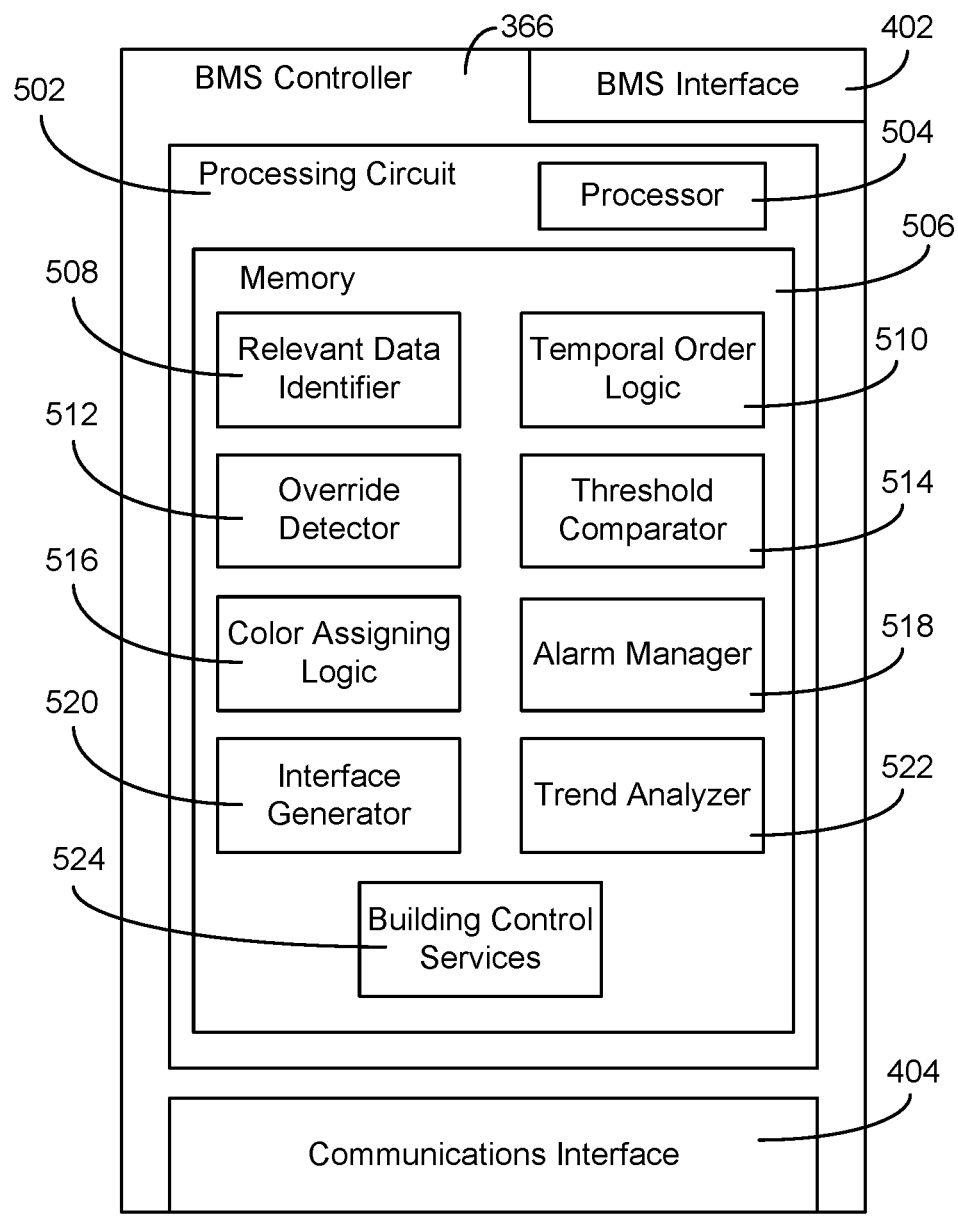
FIG. 5 is a detailed block diagram of the building management system controller of FIG. 4, according to an exemplary embodiment.

Referring now to FIG. 5, a detailed diagram of BMS controller 366 is shown, according to an exemplary embodiment. BMS controller 366 is shown to include a processing circuit 502 including a processor 504 and memory 506.

Processing circuit 502 may be communicably connected to BMS interface 402 and/or communications interface 404 such that processing circuit 502 and the various components thereof can send and receive data via interfaces 402 and 404. Processor 504 can be implemented as a general purpose processor, an application specific integrated circuit (ASIC), one or more field programmable gate arrays (FPGAs), a group of processing components, or other suitable electronic processing components.

Memory 506 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 506 may be or include volatile memory or non-volatile memory. Memory 506 may include database components, object code components, script components, or any other type of information structure for supporting the various activities and information structures described in the present application. According to an exemplary embodiment, memory 506 is communicably connected to processor 504 via processing circuit 502 and includes computer code for executing (e.g., by processing circuit 502 and/or processor 504) one or more processes described herein.

In some embodiments, BMS controller 366 is implemented within a single computer (e.g., one server, one housing, etc.). In various other embodiments BMS controller 366 may be distributed across multiple servers or computers (e.g., that can exist in distributed locations). For example, BMS controller 366 may be implemented as part of a Facility Explorer brand building automation system, as sold by Johnson Controls Inc. In other embodiments, BMS controller 366 may be a component of a remote computing system or cloud-based computing system configured to receive and process data from one or more building management systems. For example, BMS controller 366 may be implemented as part of a PANOPTIX® brand building efficiency platform, as sold by Johnson Controls Inc. In other embodiments, BMS controller 366 may be a component of a subsystem level controller (e.g., a HVAC controller), a subplant controller, a device controller (e.g., AHU controller 330, a chiller controller, etc.), a field controller, a computer workstation, a client device, or any other system or device that receives and processes data.

Still referring to FIG. 5, memory 506 is shown to include a relevant data identifier 508, temporal order logic 510, an override detector 512, a threshold comparator 514, color assigning logic 516, an alarm manager 518, an interface generator 520, a trend analyzer 522, and a controller 524. Memory modules 508-524 may be configured to receive inputs from building subsystems 410 and other data sources, determine optimal control actions for building subsystems 410 based on the inputs, generate control signals based on the optimal control actions, and provide the generated control signals to building subsystems 410. Although memory modules 508-524 are shown as components of BMS controller 366, it is contemplated that one or more of modules 508-524 may be a component of a user device, and may receive raw data from BMS 400 for use in generating the deconstructed graphical user interface. The following paragraphs describe some of the general functions performed by each of memory modules 508-524 in BMS 400.

Still referring to FIG. 5, relevant data identifier 508 may read and categorize building data received by BMS controller 366. For example, relevant data identifier 508 may read all data received by BMS controller 366 and tag each data point with the appropriate control group, such as temperature, air flow, air quality, etc. In some implementations, data identifier 508 receives a selection of a control group and identifies data points which are associated with the selected control group. For example, a selection of the temperature control group is made, and data identifier 508 may identify data points such as air temperature setpoint, air temperature, AHU supply fan status, etc.

Memory 506 is shown to include temporal order logic 510, which may determine a temporal order in which to present building data to a user. Temporal order logic 510 may determine an order in which to present data categorized by data identifier 508. For example, data identifier 508 may read and categorize all data received by BMS controller 366. When a selection of a control group is made, temporal order logic 510 may then determine an order in which to present a user with the data associated with the selected control group. Temporal order logic 510 may determine the order based on a physical arrangement of the related equipment in the building. For example, if the temperature control group is selected, data collected which may affect the process variable (e.g., temperature) may be ordered based on the order in which the associated components are arranged in an exemplary HVAC system. Temporal order logic 510 may order building data for display such that AHU parameters appear before VAV parameters. The temporal order determined by logic 510 may be stored in database 406. For example, once an order has been determined, logic 510 may store the order in database 406 and associate the order with the specified control group to expedite future processing involving the same control group.

Referring still to FIG. 5, override detector 512 may determine whether a parameter has been overridden by a user. For example, if a system operator knows that a particular section of an HVAC system is malfunctioning and wishes to keep building conditions stable while working on a solution, he may decide to override an automated operation of a component of the HVAC system. A system operator may decide to override the cooling output of a VAV box and set it to cool even when it is a heating degree day (HDD) because the heating output of the VAV box is operating at over 100% normal capacity. In some embodiments, override detector 512 may flag a parameter for later processing to alert the rest of the system. For example, if the cooling output of a VAV box has been overridden to operate at 80% when it is an HDD, override detector 512 may flag the cooling output of the VAV box. The flag may be stored in database 406, or the flag may be set as an integral part of the building data. For example, a specific portion of the building data may be reserved for status indicators such as an override flag.

Threshold comparator 514 may compare current measured values with predetermined threshold values. These threshold values may define ranges of a process variable. In some embodiments, each range defined by threshold values is associated with a status of the operation of the building system. For example, a desirable operating range may be defined as being between a lower threshold value and a higher threshold value for a process variable. Values outside of the desirable operating range may further be classified based on the number of thresholds past the desirable operating range the value is. For example, if a temperature value falls within the range which is two threshold values below the lower threshold value for the desirable operating range for temperature, the temperature value may be classified as an alarm-initiating value. The calculated ranges may be stored in database 406 and associated with the control group and parameter for which the ranges were calculated. In some embodiments, standards for ranges may be read by BMS controller 366 and stored in database 406. Threshold comparator 514 may simply read the thresholds and compare current values to the thresholds.

Still referring to FIG. 5, color assigning logic 516 may determine which colors to assign to each parameter when displayed. Color assigning logic 516 may determine which colors to assign to ranges of a process variable as determined by threshold comparator 514. For example, a desirable operating range may be rendered in a non-threatening color such as green, while an alarm-initiating value may be displayed in red. Color assigning logic 516 may control graphical parameters such as transparency and intensity of a color assigned to a parameter. In some implementations, the colors assigned to each parameter or range of values may be stored in database 406. Colors assigned to each parameter or range of values may be passed to rendering module or to a next stage.

Memory 506 is shown to include alarm manager 518, which may activate, deactivate, escalate, deescalate, etc. alarms for BMS 400. In some implementations, alarm manager 518 manages alarms of BMS 400 based on a status or value of one or more parameters. The status of a parameter may be determined based on parameter ranges defined by threshold values, such as those calculated by threshold comparator 514. For example, the status of a temperature parameter may be high-alert if the temperature parameter has a value outside of a desirable operating range by more than a predetermined amount. Alarm manager 518 may manage alarms based on any combination of statuses or values of parameters within a selected control group. In some implementations, alarm manager 518 may manage alarms based on any parameters regardless of control group relationships.

Still referring to FIG. 5, memory 506 is shown to include an interface generator 520. Interface generator 520 may generate a graphical representation of data associated with a selected control group. In some implementations, interface generator 520 generates interfaces for each of the control groups prior to receiving a selection of a control group. For example, if BMS controller 366 receives data for four control groups, interface generator 520 may generate representations for each of the control groups and store the representations in database 406. In other embodiments, interface generator 520 may store generated representations in storage media other than database 406. In some embodiments, interface generator 520 may generate an interface for a control group based on the calculations and determinations made by previously described memory modules 508-518. Interface generator 520 may generate a deconstructed graphical user interface using the results of processing of each of the previous memory modules. Using the identified data from module 508, interface generator 520 may generate a deconstructed graphical user interface which is presented in a list form. The generated interface may display information in the order determined by temporal order logic 510. In some implementations, interface generator 520 may store the generated interface in database 406. The generated interface may be stored and associated with the selected control group, a process variable, or any other characteristics which are related to the generated interface. In some embodiments, the generated interface may be tagged with each of the characteristics for ease of future interface generation. Interface generator 520 may then reduce loading times for later selections.

Still referring to FIG. 5, memory 506 is shown to have trend analyzer 522. Trend analyzer 522 may analyze building data to generate trend data for display to a user. Trend analyzer 522 may receive building data from building subsystems 410. Trend analyzer 522 may store data in database 406 to create graphs of building data over time. In some embodiments, trend analyzer 522 obtains historical building data directly from building subsystems 410. For example, each subsystem may contain a memory in which it stores a certain amount of data for transmitting to BMS controller 366. The graphs and trends created by trend analyzer 522 may be stored in database 406. Graphs and trends may be generated for each control group or field point prior to being requested, and may reduce loading times. In other embodiments, trend analyzer 522 generates graphs and trends upon receiving a request for a specific control group, saving memory space.

Still referring to FIG. 5, memory 506 is shown to include a building control services module 524. Building control services module 524 may be configured to automatically control the BMS and the various subsystems thereof. Building control services module 524 may utilize closed loop control, feedback control, PI control, model predictive control, or any other type of automated building control methodology to control the environment (e.g., a variable state or condition) within building 10.

Building control services module 524 may receive inputs from sensory devices (e.g., temperature sensors, pressure sensors, flow rate sensors, humidity sensors, electric current sensors, cameras, radio frequency sensors, microphones, etc.), user input devices (e.g., computer terminals, client devices, user devices, etc.) or other data input devices via BMS interface 402. Building control services module 524 may apply the various inputs to a building energy use model and/or a control algorithm to determine an output for one or more building control devices (e.g., dampers, air handling units, chillers, boilers, fans, pumps, etc.) in order to affect a variable state or condition within building 10 (e.g., zone temperature, humidity, air flow rate, etc.).

In some embodiments, building control services module 524 is configured to control the environment of building 10 on a zone-individualized level. For example, building control services module 524 may control the environment of two or more different building zones using different setpoints, different constraints, different control methodology, and/or different control parameters. Building control services module 524 may operate the BMS to maintain building conditions (e.g., temperature, humidity, air quality, etc.) within a setpoint range, to optimize energy performance (e.g., to minimize energy consumption, to minimize energy cost, etc.), and/or to satisfy any constraint or combination of constraints as may be desirable for various implementations.

In some embodiments, building control services module 524 uses the location of various mobile devices and/or the identity of users associated with mobile devices to translate an input received from a building system into an output or control signal for the building system. For example, building control services module 524 may receive location information for mobile devices from an optional location determination module within memory 506. Building control services module 524 may determine a total number of mobile devices (and corresponding occupants) in a building zone based on the locations of mobile devices. In some embodiments, building control services module 524 controls the environment of a building zone based on an estimated number of occupants in the building zone. For example, a large number of occupants in a building zone may cause building control services module 524 to increase air flow to a building zone to recycle air more quickly.

In some embodiments, building control services module 524 receives identity information from an optional user determination module within memory 506. Building control services module 524 may use the identity information in conjunction with the mobile device location information to determine the identities of occupants in each of a plurality of building zones. Building control services module 524 may use the location information and/or the identity information to automatically adjust control parameters for various building zones.

In some embodiments, building control services module 524 uses the identity information for a user associated with a mobile device to identify the user's preferred environment conditions (e.g., temperature conditions, air flow conditions, etc.) for a building zone. When the user (or mobile device associated with the user) enters a building zone, building control services module 524 may automatically adjust control setpoints (e.g., temperature setpoints, flow rate setpoints, etc.) for the building zone to the user's preferred values. In some embodiments, if two or more users with conflicting preferences are located within the same building zone, building control services module 524 may use the user identities (determined by user determination module) to select one set of preferred control parameters over another (e.g., based on user authority levels, based on which user is higher ranking in an organization, etc.).

User Interfaces

Figure 6:
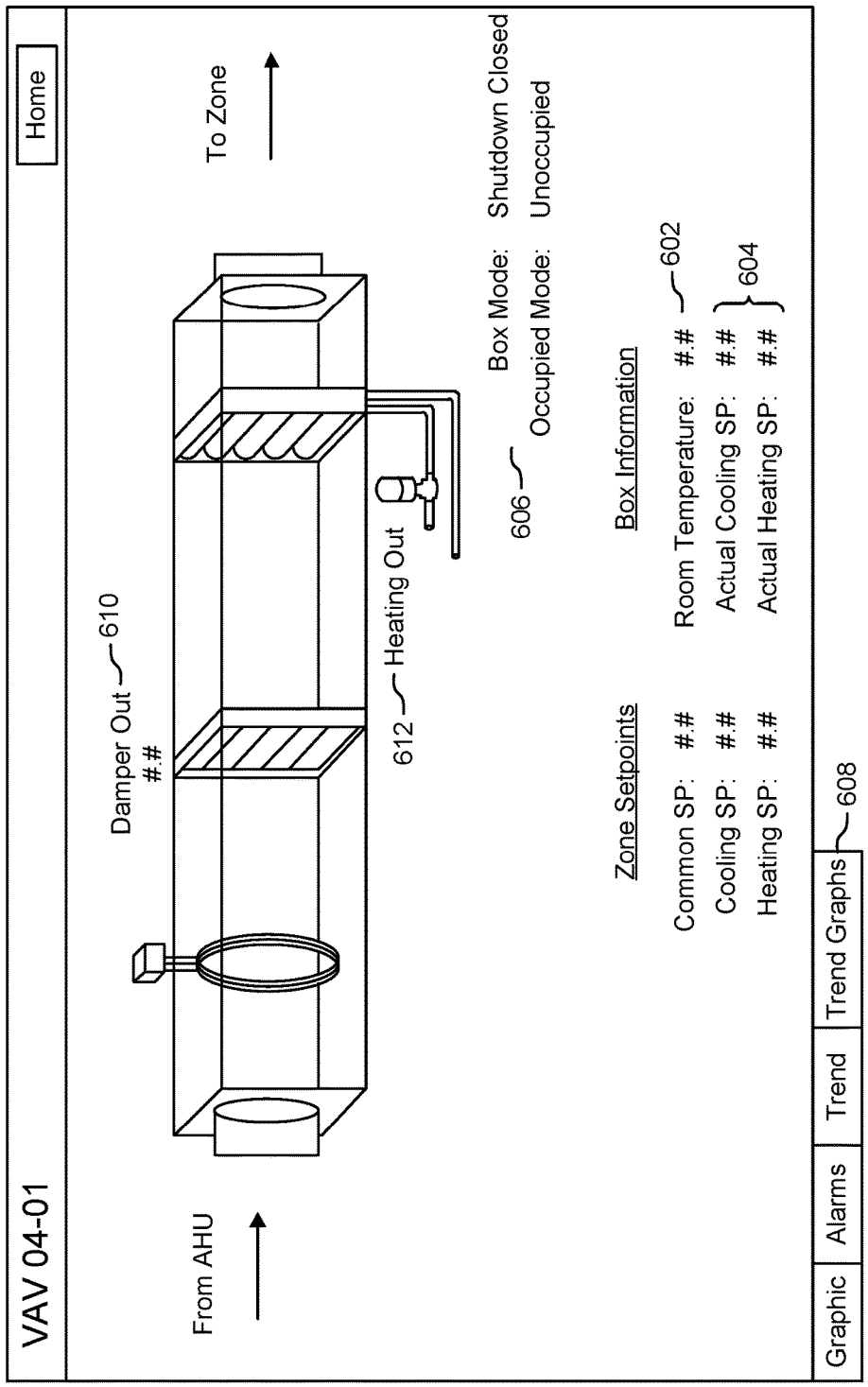
FIG. 6 is a drawing of a conventional HVAC control system interface, according to an exemplary embodiment.

Referring now to FIG. 6, a conventional interface 600 for an HVAC control system is shown. Traditionally, control system interfaces for HVACs have been in the form of graphics which show the portion of the system being controlled, with information scattered around the interface. A user's attention may jump to many different places around the graphic while troubleshooting a call. For example, a user may receive a call from a room which is associated with a specific VAV box system. The call may be reporting that the room is too hot. The user may need to figure out what the current temperature in the space is, and may look at the current temperature 602. Next, the user may look for what the setpoints of the system are, or what temperature the system is trying to achieve. The user may look to setpoints 604. Upon determining the setpoints of the system, a user may look for whether the room is occupied. The occupancy of the room may be indicated by a field 606. In addition to determining simply whether a room is occupied, a user may try to find out how the system is reacting to the complaint that the room is hot. Next, a user may try to ascertain the amount of time for which the room has been at its current temperature. The user may choose a different page 608 to view trend data and historical data associated with the system. The next step may be to determine whether the associated AHU is running, and what the temperature of the air coming from the AHU is. The user may need to navigate to the graphic of the AHU, forcing her to leave her current page. Next, the user may try to determine how much the system is trying to cool the space. An indirect measure of cooling may be damper output 610 since the damper maintains flow in the system. A last step may be to determine what the output of any reheat is, which a user may determine by looking at heating output 612. The many places in which a user must look may be non-intuitive and time consuming.

The deconstructed graphical user interface of the present disclosure provides a solution to the inefficient and ineffectual traditional HVAC control interface. The deconstructed graphic may separate field points by the way they are controlled by the system. For example, a VAV box system may have the following control groupings: temperature, flow, air quality, etc. The control groups may contain only the field points that are related to their particular control. In some embodiments, the control groups may contain fields points which are not related to their particular control. In such cases, the unrelated field points may be hidden or may appear farther down on the list. Furthermore, the temporal order will be provided based on media flow direction; a user may select whether to view in forward or reverse flow direction. In a conventional HVAC graphic, a user's eyes may follow the air flow within the ductwork past dampers, valves, sensors, etc. Then his eyes may jump to field points such as setpoints and modes of operation to get the full picture. A deconstructed graphic may provide those points in a list type order, in a top-down approach (as if he was looking upstream or downstream through the ductwork. Similar view may be provided based on water flow. The control group may also include associated system points related (as available) to the type of control being viewed. For example, when viewing the temperature control of a VAV box system graphic, the supply fan status, discharge air temperature, discharge air temperature setpoint, etc. may be shown in the appropriate order in the list.

When available, values from pertinent associated HVAC systems and subsystems may be shown along with the current system. There may be multiple associated HVAC systems; if shown, the list may be split into columns.

Figure 7A:
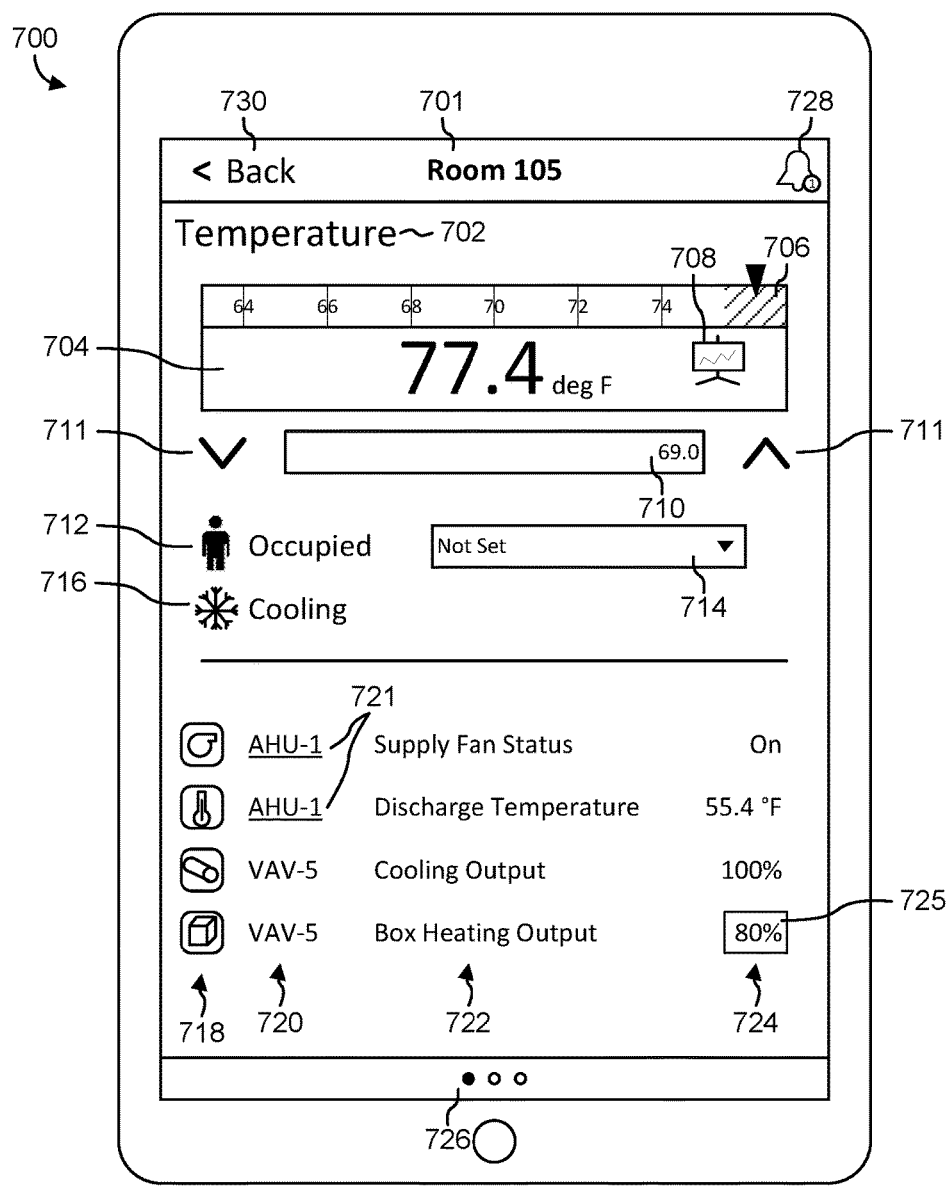
FIG. 7A is a drawing of a deconstructed graphical user interface, according to an exemplary embodiment.

Referring now to FIG. 7A, a first page 700 of a deconstructed graphical user interface for controlling an HVAC system is shown. Page 700 may be minimal and focused to provide a tool which may be used efficiently by a technician or building manager. The order in which data are displayed is a novel and effective way to assist users in managing an HVAC system (current implementations that may be in list form are generally in alphabetical order). In some embodiments, page 700 may display items, icons, and text in various colors. Default colors for page 700 may be subdued colors so that status colors are more prominent when shown. For example, all items shown in page 700 may be displayed in pastel colors, while an alarm or warning may be shown in bright red.

Page 700 is shown to be divided into areas of control. In this exemplary embodiment, the temperature control group of a VAV box system is shown. Page 700 may only provide relevant information about the temperature control group. Other pages may provide relevant information about other control groups and are not limited to the control groups described in the present disclosure. The selected control group may be indicated by a control group name 702. For example, the control group name shown is "Temperature," indicating that the information shown is relevant to the temperature control group. Page 700 may display information regarding zone 701. For example, in this exemplary embodiment, page 700 is displaying data for "Room 105."

Page 700 may further be broken into sections, one of which contains information about the process variable, or currently controlled output device (e.g., an output device associated with the process variable). For example, the process variable may be zone temperature. The current value 704 of the process variable (e.g., 77.4° F.) may be displayed in large, prominent font to draw a user's attention. In some implementations, the background or color of the font for the process variable may change based on the value of the process variable or the status of the associated output device. For example, if the temperature is in a warning or alarm range, the background of current value 704 may be a bold red and the font may be white. If the output device is offline, the background of current value 704 may be black and the font may be white. The background of current value 704 may be light grey or white during normal operation and the font may be black.

Above current value 704, page 700 is shown to have a dynamic range indicator 706. In some embodiments, the values may be displayed in bands of color to indicate setpoint or desirable, warning, alarm, etc. ranges. Colors for each band may correspond to the values and what they represent. The colors of dynamic range indicator 706 may correspond to the colors of current value 704, and may be determined by a user or automatically by the system. In some embodiments, the colors may be calculated as a function of the range of the values and may produce a gradient. For example, colors may range from green to red when moving from a normal operating range to an alarm range. Dynamic range indicator 706 is shown to have an arrow indicating the current value of the process variable and its place in the defined ranges. For example, the arrow is shown to be at 77.4, which is the scalar of current value 704. Dynamic range indicator 706 may have ranges such as a normal operating range, an above setpoint range, a below setpoint range, warning ranges, and alarm ranges. For example, the arrow may indicate that the temperature is currently in the alarm range. It is contemplated that more or fewer ranges may be included. In some embodiments, the ranges may be symmetric on either side of the setpoints. In other embodiments, the size of the ranges may differ depending on whether the range is above or below a setpoint.

Trend viewer button 708 takes a user to a custom graphical trend display focused on the selected control group. For example, clicking on trend viewer button 708 may take a user to custom historical graphs specifically related to zone temperature control. The trend viewer and its operation are described more fully in FIGS. 8 and 12.

Beneath current value 704, page 700 is shown to have an editable setpoint 710. Different HVAC system types may have multiple setpoints; editable setpoint 710 may be the setpoint an end user is most likely to want to edit. For example, editable setpoint 710 is 69.0, a scalar of the desired zone temperature for the specific room shown. In some embodiments, multiple setpoints may be shown, such as a local setpoint at a sensor in the zone, warmer or cooler adjustment at a sensor in the zone, etc. A user may edit setpoint 710 by using arrow keys 711, or by typing in a new value. For instance, a user may want to change setpoint 710 to 71.5, and may make changes by pressing the up arrow or by typing in 71.5.

Beneath the information pertaining to the process variable, more sections of page 700 are shown which allow a user to quickly modify or override the process variable. Fields such as overall occupancy 712 may be shown. Occupancy 712 may be editable, as shown by drop down menu 714. In some embodiments, menu 714 is a text field and is editable by typing in a value. In other embodiments, menu 714 may be a toggle field. Menu 714 may be any of a number of possible input methods, and is not limited to those explicitly enumerated. Occupancy 712 is shown to have an icon of a person next to the field. In some embodiments, no icon is available. In other embodiments, the icon is user configurable, and may be changed. In yet other embodiments, the icon may be automatically selected from a standard library by the system. A mode of operation 716 is shown to be included in page 700 just below occupancy 712. For example, mode of operation 716 may be cooling mode. Mode of operation 716 is shown to have an icon of a snowflake next to the field, and properties of the icon next to 716 are similar to those of the icon next to occupancy 712.

The next section may include field points in a user-configurable media flow direction (a user may select forward or reverse). In an exemplary embodiment, the media is air. The media could be water, glycol, etc. The field points may be arranged in a list, with icons 718, system names 720, field point names 722, and current field point values 724. In the forward direction, the list may begin at the media source. In the reverse direction, the list may begin at the last field point associated with the selected control group and end with the media source. In some embodiments, icons 718 may be colored or have colored backgrounds. The backgrounds of icons 718 may inform a user of the status of the associated field point. For example, if a field has been overridden by a user, its icon may appear in orange. The colors of an icon may correspond with the colors of dynamic range indicator 706. The colors of an icon may be user-configurable or may be automatically selected by the system. In some embodiments, the font of each of the field points may be colored to inform a user of its status. The color of the font may correspond with the color of the background.

Icons 718 may allow a user to quickly identify the subsystem, component, or characteristic with which the respective field point is associated. In some embodiments, icons 718 have a stylized graphic of the subsystem or component. For example, a discharge temperature icon may show a thermometer. System names 720 may indicate the names of the systems or devices in the media flow path associated with the process variable. For example, page 700 is shown displaying the system names "VAV-5" identifying a particular VAV system and "AHU-1" identifying a parent AHU system that provides airflow to the identified VAV system. If the VAV system is not associated with a parent AHU system, the AHU field points may be replaced with a message or prompt to define a parent system. For example, the AHU field points may be replaced with the message "Would you like to associate this VAV System with an AHU System?" In some embodiments, system names 720 may contain links to the pages of the named system as demonstrated with fields 721. For example, if system name 720 reads "AHU-1" and is shown to be hyperlinked, a user may click on system name 720 to be taken to the control page of AHU-1. Field point names 722 allow a user to identify the field point she is obtaining information on. For example, field points may include supply fan status, discharge temperature, cooling output, box heating output, etc. Current field point values 724 may show the status or current value of the corresponding field point. Each value may have a unit associated with it, and that unit may be displayed in page 700. Some values may be scalars. In some embodiments, a current field point value 724 may be a status such as ON. For example, current field point values 724 may be the percentage of output or the temperature measured at some point in the system. Current field point value 724 may have a background or font color indicating the status of the associated field point. For example, if the field is overridden by a user, the background of current field point value 724, as demarcated by outline 725, may be orange and the font may be white.

Still referring to FIG. 7A, page 700 is shown to have page indicators 726. In an exemplary embodiment, page indicators 726 are shown to be dots. Page indicators 726 may be colored to show which page a user is currently viewing. For example, the current page may be filled in and appear as a black circle, while other pages are displayed as open outlines of circles. In some embodiments, page indicators 726 may show how many pages are available for viewing. For example, three circles may be displayed in page 700 to indicate that there are three pages available for viewing. Page indicators 726 may inform a user of their position in the ordering of pages. For example, if a user is on the first page of three pages, three circles may be shown, with the first circle colored in.

Page 700 may include an alarm indicator 728. Alarm indicator 728 may be a link to the alarm management page or program. In some embodiments, alarm indicator 728 may be colored to inform a user of the level of the alarm. For example, if a high-leveled alarm is activated, alarm indicator 728 may be shown in red. In other embodiments, alarm indicator 728 may inform a user of how many alarms are currently activated. For example, if there is currently one alarm, alarm indicator 728 may include a number indicator which displays "1."

Still referring to FIG. 7A, page 700 may include a navigation button 730. In this exemplary embodiment, button 730 reads "Back" and may take a user to the previous page she was on. Navigation button 730 may take a user to a menu of available pages. In some embodiments, navigation button 730 may display a map or system diagram of the system and its components.

Figure 7B:
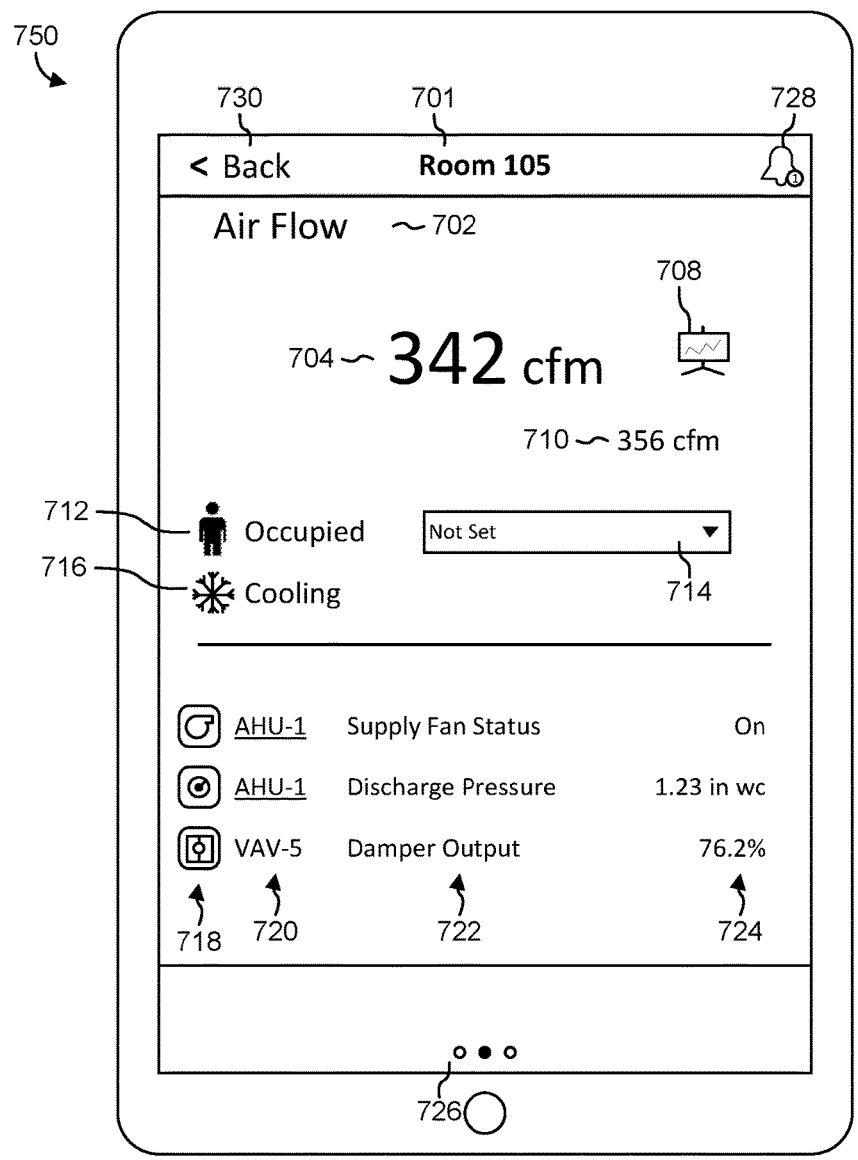
FIG. 7B is another drawing of the deconstructed graphical user interface, according to an exemplary embodiment.

Referring now to FIG. 7B, a second page 750 of the deconstructed graphical user interface is shown. Portions of the figure labelled with the same figure number as in FIG. 7A are intentionally marked to indicate that the items are identical. FIG. 7B is an exemplary embodiment of a different page available to a user. Page 750 may contain information about a different control group (e.g., air flow, air quality, humidity, etc.) and may have a different control group name 702. For example, control group name 702 is now Air Flow. In some embodiments, a user accessing the deconstructed graphical user interface on a mobile or touch-sensitive device may simply swipe left or right to transition between control group pages (e.g., pages 700 and 750). Any systems of the HVAC system may have a separate page or section. Each section may have redundant information if field points affecting the operation of control group overlap, as the deconstructed graphical user interface may provide all information related to the control group being viewed. In some embodiments, no hyperlinks are included in control group names 702. In other embodiments, no background color is applied to current field point values 724.

In some embodiments, the portion of the interface which contained information regarding the process variable is shown to no longer include a dynamic range indicator, as no ranges may exist for the specified process variable. When no ranges exist, the interface may include a button which may redirect the user to add an alarm range and/or warning range for the process variable. For example, the interface may include an "Add Alarm" button with a plus symbol that can be selected to add an alarm range and/or warning range for the process variable. If no alarms have been set up for the selected control group, the background and font colors may remain subdued. For example, if no alarms are set up for air flow, the background color and font of the current value 704 of the process variable air flow would remain a neutral or subdued color. The current value 704 is shown to have changed to 342 cfm, with a different scalar and a different and appropriate unit.

Setpoint 710 is shown below current value 704, but in this exemplary embodiment, is no longer presented in a textbox, as it may not be modified by a user. In some embodiments, setpoints are controlled internally by the system based on other control groups. For example, the air flow setpoint may be controlled based on the temperature control group.

Trend viewer button 708 may take a user to a similar trend page to that of page 700. In some embodiments, trend data displayed on a page to which a user is directed from page 750 may pertain only to field points related to the selected control group of page 750. If no trend information for the process variable exists, the interface may include a button which may redirect the user to add trend information. For example, the interface may include an "Add Trend" button with a plus symbol that can be selected to add trend data for the process variable (e.g., by associating the process variable with trend information).

Figure 8:
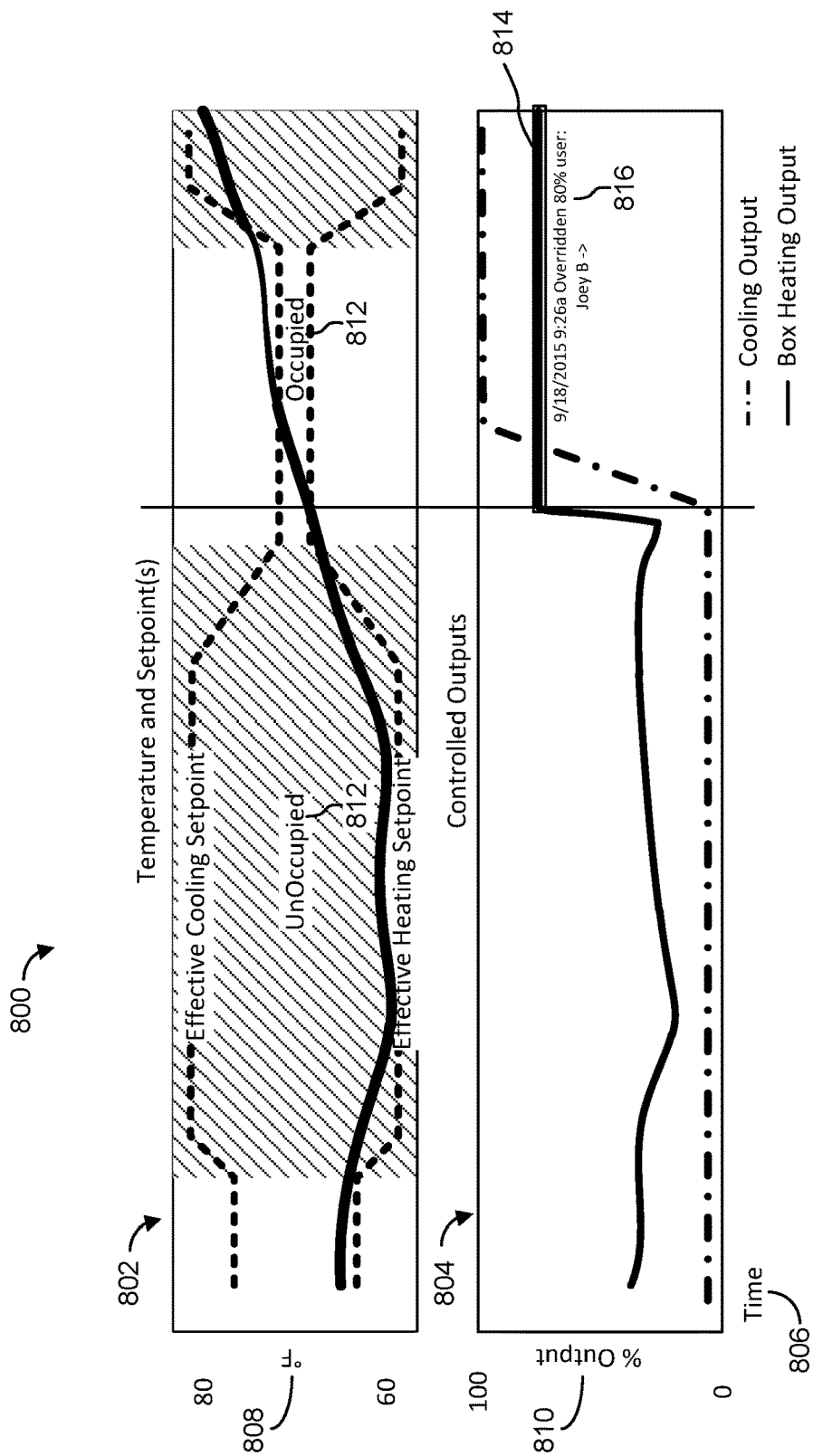
FIG. 8 is a drawing of a trend viewer page of the deconstructed graphical user interface of FIG. 7A, according to an exemplary embodiment.

Referring now to FIG. 8, trend page 800 is shown. Trend page 800 may typically align with the portion of the control group from which page 800 was launched. In some embodiments, trend page 800 is dynamically created without the need for end user configuration. In an exemplary embodiment, Room 105 is used as the zone for which building data is analyzed.

Trend page 800 may consist of two stacked trend graphs 802 and 804. Other graphs and types of data visualizations not specifically described may also be incorporated. Graphs 802 and 804 on page 800 may share an x-axis 806. In some embodiments, x-axis 806 is time. X-axis 806 may be any variable. Graphs 802 and 804 may be scaled to fit in the y-direction once aligned by each respective x-axis. In an exemplary embodiment, graph 802 is of temperature and setpoint data and graph 804 is of controlled output data. Y-axes 808 and 810 may be scaled to fit generated trends for ease of viewing. For example, y-axis 808 may only show between 60° F. and 80° F., while y-axis 810 may show from 0% to 100% output. In some embodiments, separating trend graphs allows for better scaling for each of the graphs.

Graph 802 may show the process variable in comparison to effective setpoints of the system. In some embodiments, no other setpoints may be shown. In other embodiments, other setpoints are included as reference points. A visual indication of the setpoint trend lines compared to the process variable trend line can be seen in graph 802. The setpoint trend lines are shown as dotted lines, and the process variable trend line is shown as a solid line. In some embodiments, the default color for lines is a subdued color such as grey. The line color may change dynamically based on the status of the value. In some embodiments, the process variable may be colored as a gradient as it moves toward or away from the setpoint it is intended to be controlled to. For example, in graph 802, as zone temperature moves above the effective cooling setpoint, it may be shown in red. As zone temperature increases above the effective cooling setpoint, it may deepen in color. When zone temperature is once again between the effective cooling setpoint and effective heating setpoint, its line may be shown in a subdued or neutral color, such as grey. In some embodiments, for a temperature trend line, an increase above a setpoint may be in a gradient of red while a decrease below a setpoint may be in a gradient of blue. This may give a visual indication of hot and cold temperatures.

The background colors of graphs 802 and 804 may be used to indicate supporting information. For example, as illustrated by shading and lack of shading, occupancy information may be included graph 802. In some embodiments, occupancy of a room is important to troubleshooting, and may be indicated by different colors and a value, or text, in the background. For example, graph 802 shows text indications 812 of whether Room 105 was occupied or unoccupied. Indications of associated system information (e.g., AHU supply fan status) may also be shown using background colors, text colors, shading, or other visual indicia to allow a user to easily obtain such information without reading the text. For example, a user can simply look at the colors and shading to determine the status of various items.

Trend values from associated controlled outputs may be displayed. For example, the cooling output (shown in a dotted line) and box heating output (shown in a solid line) trend lines are shown in graph 804. Other field point trend lines may be shown as appropriate. For example, if the VAV box system supported supplemental heating, the supplemental heating output may be shown. The color scheme for graph 804 may differ from graph 802. For controlled outputs, the base line color may be a unique color for each controlled output. The colors may help the user quickly identify which controlled output he is following. In some embodiments, the colors may be associated with meanings such as hot or cold. For example, the cooling output may be shown in blue, while the heating output may be shown in red. In additional to base line colors, a background line color may be used to indicate a field point's status. For example, box heating output may have been overridden by a user, at which point its trend line is outlined 814 in orange. In some embodiments, the default background line color may be a clear or transparent color. Additional information regarding the status of a field point may be shown as a value or text. For example, text indicator 816 gives a user information regarding the date, time, status, overridden value, and authorizer associated with the override indicated by outlined portion 814 of the box heating output trend line.

In some embodiments, the trend data shown in trend page 800 is live trend data. For example, the trends shown in graphs 802 and 804 may automatically update to include new (i.e., current) values for the monitored variables (e.g., temperature, setpoint, etc.) as the new values are received. If historical data for a monitored variable is available, the historical data may be displayed for a predetermined time frame (e.g., last 7 days, last 24 hours, etc.) which can be configured and/or customized by a user. If no historical data exists, trend page 800 may begin tracking the monitored variables when trend page 800 is first displayed. In some embodiments, trend page 800 allows a user to define a set of historical data for a monitored variable in the event that no historical data is associated with the monitored variable. For example, trend page 800 may include an "Add History" button which may redirect a user to define a historical data set. When a historical data set is selected, the time-series values from the data set may be added to the trend graphs shown in trend page 800.

Processes for Generating and Using a Deconstructed Graphical User Interface

Figure 9:
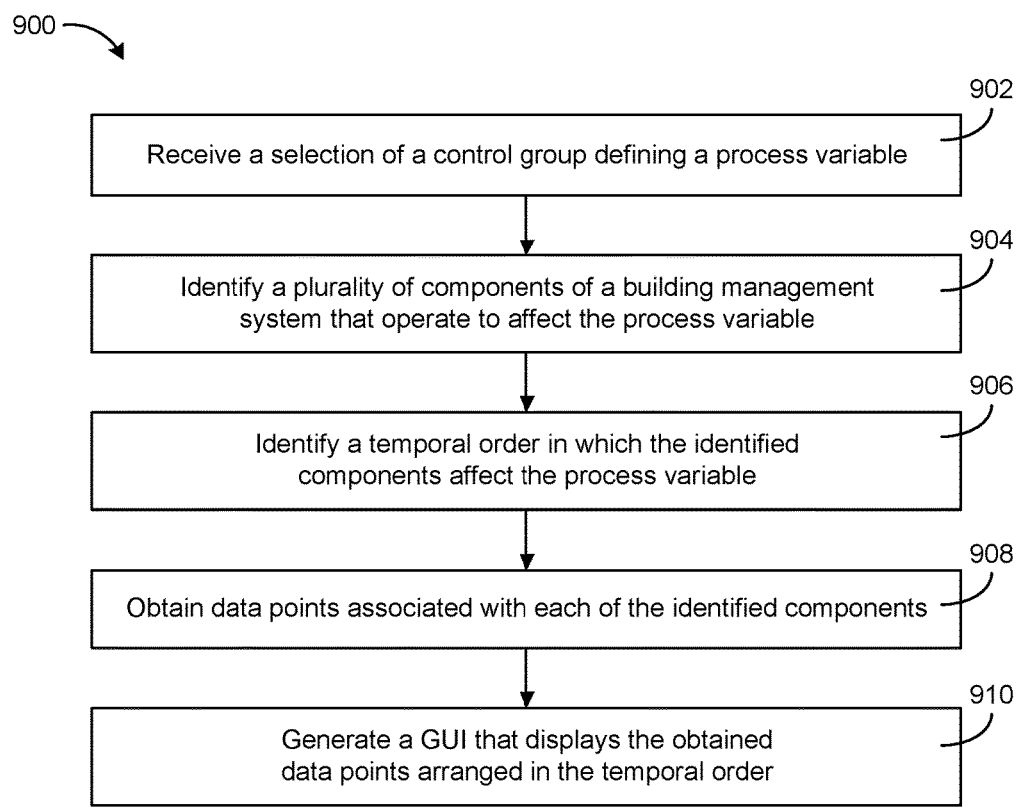
FIG. 9 is a flowchart of a process which may be performed by the system of FIG. 4 for generating the deconstructed graphical user interface of FIGS. 7A-8, according to an exemplary embodiment.

Referring now to FIG. 9, a process 900 for creating a deconstructed graphical user interface is shown according to an illustrative embodiment. The process begins with step 902, in which BMS controller 366 receives a selection of a control group. The selection of the control group may define a process variable. Next, BMS controller 366 identifies a plurality of components of a BMS that operate to affect the process variable in step 904. In some embodiments, step 904 may be performed by relevant data identifier 508. BMS controller 366 may then identify a temporal order in which the identified components affect the process variable in step 906. In some embodiments, step 906 may be performed by temporal order logic 510. Next, BMS controller 366 may obtain data points associated with each of the identified components in step 908. In some embodiments, BMS controller 366 may read the relevant data points from data base 406. In other embodiments, BMS controller 366 may receive the relevant data points directly from building subsystems 410. For example, BMS controller 366 may request only relevant data from building subsystems 410. Lastly, BMS controller 366 may generate a deconstructed graphical user interface that displays the obtained data points in step 910. The obtained data points may be arranged in the temporal order determined in step 906. In some embodiments, step 910 may be performed by interface generator 520. While process 900 has been described as being performed by BMS controller 366 and its various memory modules, process 900 may be performed by user device 408.

Figure 10:
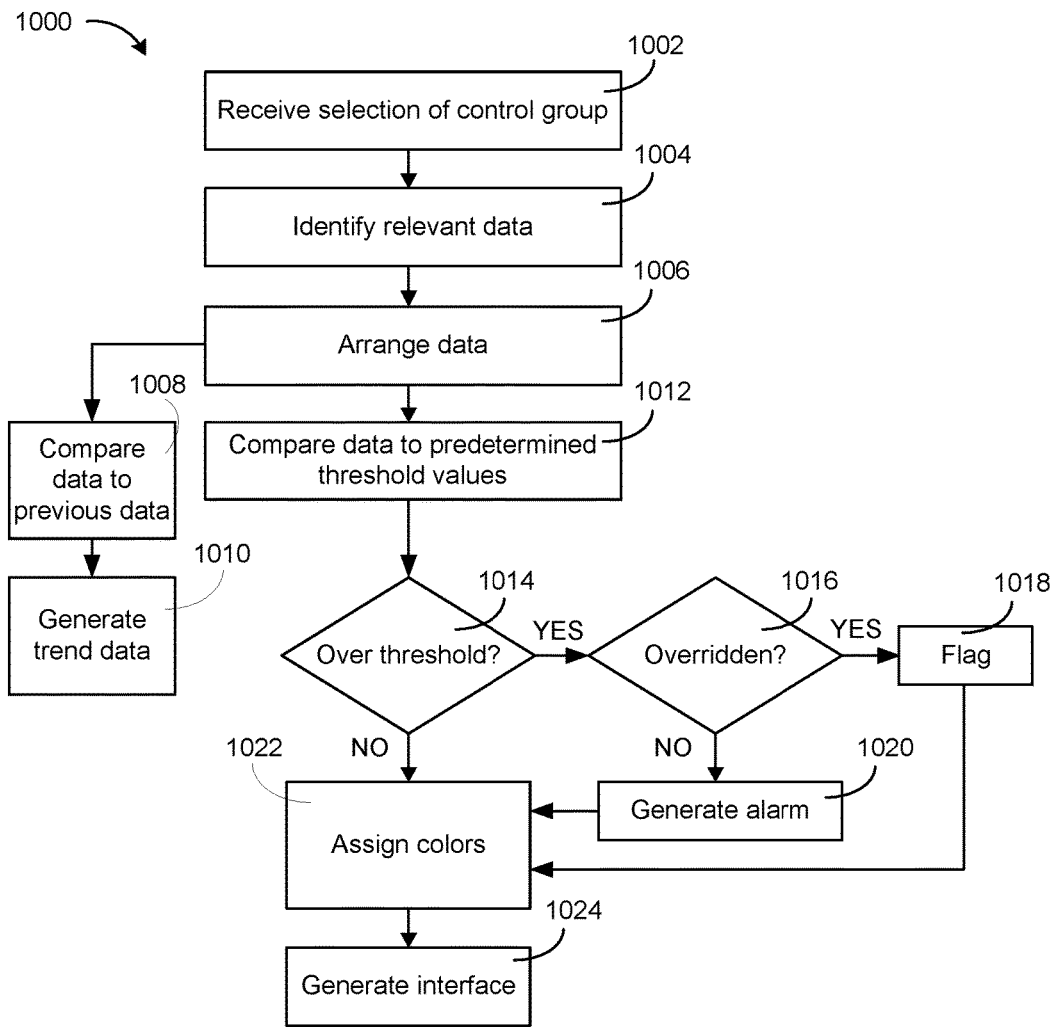
FIG. 10 is a flowchart of a process which may be performed by the system of FIG. 4 for generating a portion of the deconstructed graphical user interface of FIGS. 7A-8, according to another exemplary embodiment.

Referring now to FIG. 10, a process 1000 for generating a page for a specified control group is shown according to an illustrative embodiment. The process begins with step 1002, in which BMS controller 366 receives a selection of a control group. The selection of the control group may define a process variable. Next, BMS controller 366 identifies relevant data for the selected control group and process variable in step 1004. In some embodiments, step 1004 may be performed by relevant data identifier 508. Once relevant data has been identified, BMS controller 366 may arrange the data in step 1006. In some embodiments, the data is arranged by an order determined by temporal order logic 510. Step 1008 and 1010 may be performed in parallel with the rest of steps 1012-1024. In some embodiments, step 1008 and 1010 may be performed serially with the rest of steps 1012-1024. The order of the steps shown in FIG. 10 is meant to be an illustrative implementation, and the methods and systems of the present disclosure may cover any implementations with steps added, removed, or rearranged. In step 1008, BMS controller 366 may compare the data to previously obtained data which was identified as relevant. In some embodiments, BMS controller 366 may not compare the data to previous data, and may simply plot or graph it with the previous data. BMS controller 366 may then generate trend data for the data relevant to the selected control group in step 1010. In some embodiments, step 1010 may be performed by trend analyzer 522.

In parallel, or in series with steps 1008 and 1010, process 1000 continues with step 1012, in which BMS controller 366 compares the data to predetermined threshold values. In some embodiments, step 1012 is performed by threshold comparator 514. A decision step may follow, in which BMS controller 366 or its memory module threshold comparator 514 determines whether data points in the set of identified data are over any associated predetermined thresholds. If any data is determined to be over an associated threshold in step 1014, process 1000 continues with step 1016.

In step 1016, BMS controller 366 determines whether the field point associated with the data has been overridden by a user. In some embodiments, step 1016 may be performed by override detector 512. If field point has been overridden, process 1000 continues with step 1018, in which BMS controller 366 flags the point. In the case that the field point has not been overridden, process 1000 continues with step 1020, in which an alarm is generated. Step 1020 may be performed by alarm manager 518.

Steps 1018 and 1020 lead to step 1022, in which BMS controller 366 assigns colors to the data. If no data is determined to be over an associated threshold in step 1014, the next step is 1022 as well. Step 1022 may be performed by color assigning logic 516. In some embodiments, data from steps 1018 and 1020 may be used to assign colors. For example, if an alarm has been generated, colors may be more bold. If a field point has been flagged as overridden by a user, colors may be altered from those in normal or alarm modes of operation.

Lastly, process 1000 may continue with step 1024, in which BMS controller 366 may generate a deconstructed graphical user interface. In some embodiments, step 1024 may be performed by interface generator 520. All factors involved in process 1000 may be used to generate the interface. In some embodiments, flags raised in step 1018 and alarms generated in step 1020 may be displayed in the generated interface. For example, if an alarm is generated, a number may appear in alarm indicator 728 to inform a user of the number of alarms which are currently active. While process 1000 has been described as being performed by BMS controller 366 and its various memory modules, process 1000 may be performed by user device 408.

Figure 11:
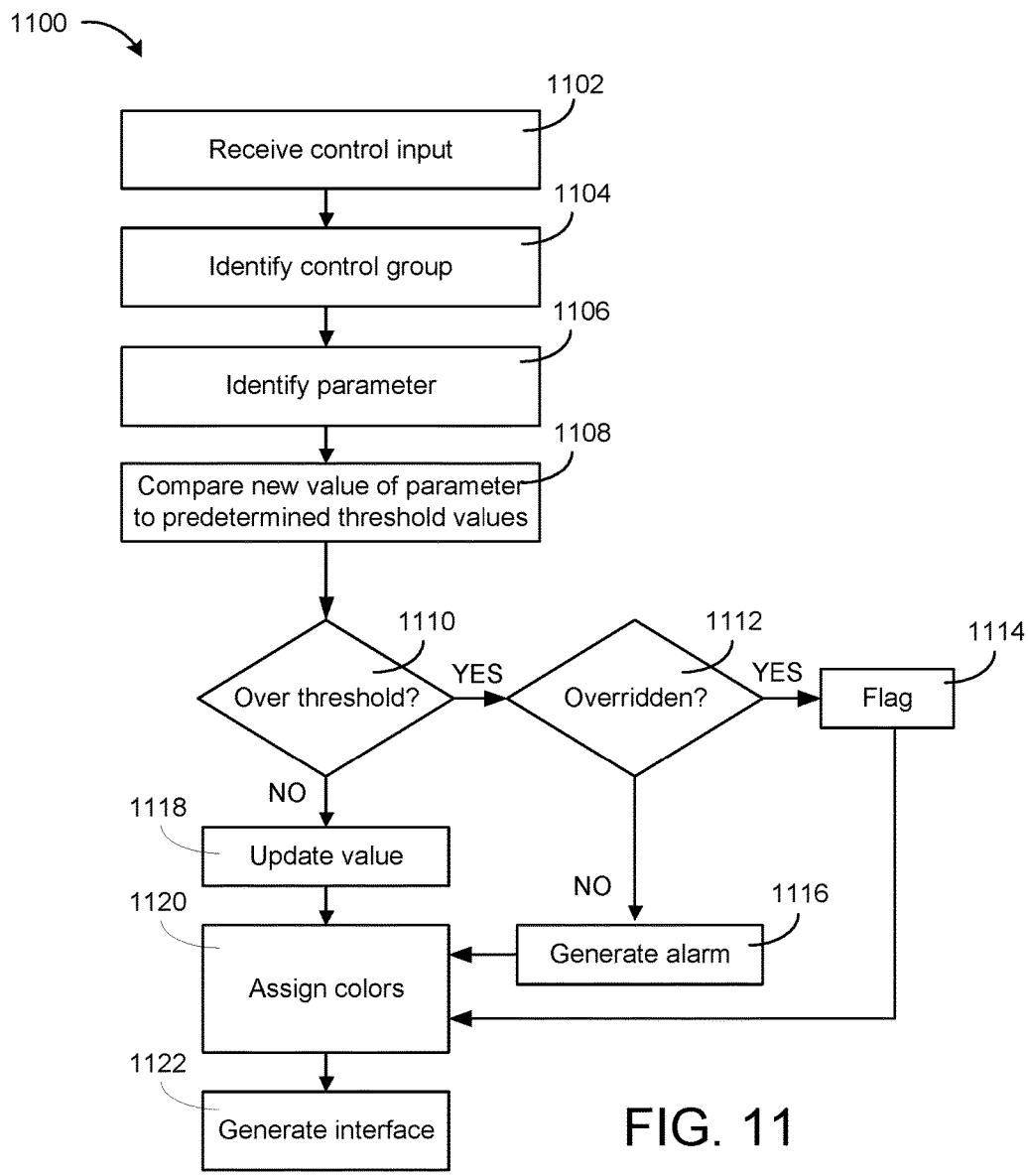
FIG. 11 is a flowchart of a process which may be performed by the controller of FIG. 5 for controlling a HVAC system through a deconstructed graphical user interface, according to an exemplary embodiment.

Referring now to FIG. 11, a process 1100 for controlling a process variable is shown according to an illustrative embodiment. The process begins with step 1102, in which BMS controller 366 receives a control input. The input may be typed or may be a combination of button or key presses, and may be in the form of input of a number, letter, selection, or any type of input which may be processed by BMS controller 366. In some embodiments, the input is received at user device 408 and is communicated to BMS controller 366 through communications interface 404.

The process continues in step 1104, in which BMS controller 366 identifies a control group based on the control input received in step 1102. The selection of the control group may define a process variable. Step 1104 may be performed by relevant data identifier 508 or may be determined by retrieving the associated control group from database 406. Next, BMS controller 366 identifies the parameter, or process variable which will affect the desired change dictated by the control input in step 1106. In some embodiments, step 1106 may be performed by relevant data identifier 508 as well.

In step 1108, BMS controller 366 may compare the new value of the parameter, determined based on the control input, to predetermined threshold values. In some embodiments, the new value of the parameter is determined by BMS controller 366. In other embodiments, the new value of the parameter is determined by user device 408. The new value of the parameter may be retrieved by looking up a value in a table correlating control input with process variable values in database 406. In some embodiments, step 1108 is performed by threshold comparator 514. A decision step may follow, in which BMS controller 366 or its memory module threshold comparator 514 determines whether the new value of the parameter is over any associated predetermined thresholds. If the new value of the parameter is determined to be over an associated threshold in step 1110, process 1100 continues with step 1112.

In step 1112, BMS controller 366 determines whether the parameter has been overridden by a user. In some embodiments, step 1112 may be performed by override detector 512. If field point has been overridden, process 1100 continues with step 1114, in which BMS controller 366 flags the parameter. In the case that the field point has not been overridden, process 1100 continues with step 1116, in which an alarm is generated. Step 1116 may be performed by alarm manager 518.

If the new value of the parameter is not determined to be over a threshold, process 1100 may continue with step 1118. In step 1118, BMS controller 366 may update the value of the parameter to the new value of the parameter.

Steps 1114 and 1116 lead to step 1120, in which BMS controller 366 assigns colors to the parameter. Step 1120 may be performed by color assigning logic 516. In some embodiments, data from steps 1114 and 1116 may be used to assign colors. For example, if an alarm has been generated, colors may be more bold. If the parameter has been flagged as overridden by a user, colors may be altered from those in normal or alarm modes of operation. In some embodiments, steps 1114 and 1116 may lead to step 1118 and allow a user to change the parameter to a value which is either invalid or in an alarm range. In other embodiments, process 1100 continues with step 1122.

Lastly, process 1100 may continue with step 1122, in which BMS controller 366 may generate a deconstructed graphical user interface. In some embodiments, step 1122 may be performed by interface generator 520. All factors involved in process 1100 may be used to generate the interface. In some embodiments, flags raised in step 1114 and alarms generated in step 1116 may be displayed in the generated interface. For example, if an alarm is generated, a number may appear in alarm indicator 728 to inform a user of the number of alarms which are currently active. While process 1100 has been described as being performed by BMS controller 366 and its various memory modules, process 1100 may be performed by user device 408 or any device with processing power.

Figure 12:
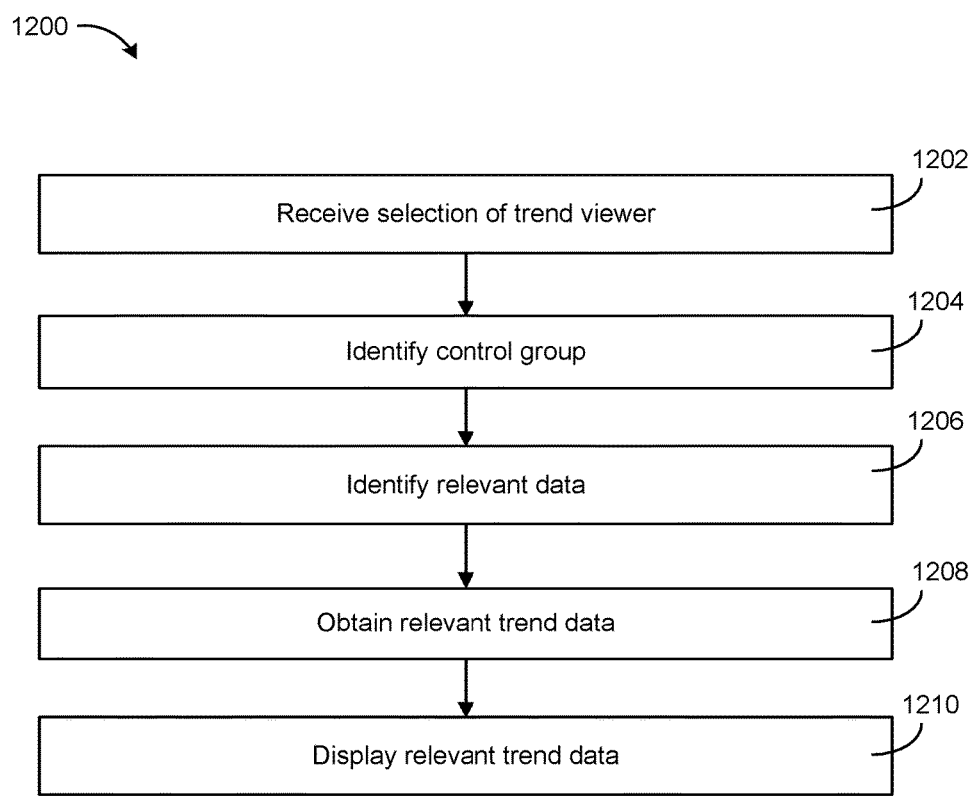
FIG. 12 is a flowchart of a process which may be performed by the system of FIG. 4 for generating trend viewer page of the deconstructed graphical user interface of FIGS. 7A-8, according to an exemplary embodiment.

Referring now to FIG. 12, a process 1200 for displaying a trend graphic associated with a control group is shown. Process 1200 begins with step 1202, in which BMS controller 366 receives a selection of the trend viewer page. The selection may be a press of trend viewer button 708, or may be an action of a user to navigate to the trend viewer page. In some embodiments, a user accessing the deconstructed graphical user interface using a touch-sensitive mobile device may be able to swipe to the page. In other embodiments, a user may select the navigation button 730 and either access a menu or screen to select the trend viewer page.

Once BMS controller 366 receives the command to display the trend viewer, BMS controller 366 may identify a control group associated with the page a user was previously viewing in step 1204. In some embodiments, step 1204 may be performed by relevant data identifier 508. Upon identifying the associated control group, BMS controller 366 may identify data relevant to the control group in step 1206. Step 1206 may be performed by relevant data identifier 508 of BMS controller 366 as well. In some embodiments, relevant data may be obtained by retrieving stored data associated with the control group from database 406. Next, BMS controller 366 may obtain relevant trend data in step 1208. In some embodiments, trend data has already been generated and is stored in database 406. Trend data may be transmitted automatically to BMS controller 366 by database 406, or BMS controller 366 may retrieve trend data from database 406. In some embodiments, trend data is generated as it is requested, and BMS controller 366 may request relevant data to generate trend data directly from building subsystems 410.

Lastly, BMS controller 366 may display the obtained relevant trend data in step 1210. Step 1210 may be performed by interface generator 520. In some embodiments, a user may select how much and which pieces of data are displayed. In other embodiments, the system may automatically select the layout and content of the trend viewer page. While process 1200 has been described as being performed by BMS controller 366 and its various memory modules, process 1200 may be performed by user device 408 or any device with processing power.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A non-transitory computer readable medium storing code which, when executed by a processor of a building management system computing device comprising a display screen causes the computing device to:
   display on a screen a menu listing one or more selectable pages corresponding to one or more building equipment components of a building management system (BMS); and
   display on the screen a selectable control group page that can be reached directly from the menu;
   wherein the control group page displays a limited list of data offered within the one or more selectable pages corresponding to one or more components of the BMS, the data in the list being selectable to launch the respective page corresponding to the component of the BMS;
   wherein the limited list of data offered within the control group page comprises data points indicating current statuses of only those building equipment components of the BMS that operate to affect the control group, the data points being presented in a temporal order in which the building equipment components operate to affect the control group; and
   wherein the control group page is displayed while the one or more selectable pages corresponding to one or more building equipment components of the BMS are in an unlaunched state.

2. The non-transitory computer readable medium of claim 1, wherein the code, when executed by the processor, is further configured to cause the computing device to generate trend graphics for trend data relevant to the control group of the selected control group page prior to the trend graphics being requested by a user.

3. The non-transitory computer readable medium of claim 1, wherein the code, when executed by the processor, is further configured to cause the computing device to display a process variable associated with the control group of the selected control group page and at least one of: one or more setpoints, a warning, and an alarm.

4. The non-transitory computer readable medium of claim 3, wherein the code, when executed by the processor, is further configured to cause the computing device to display a dynamic indicator of the process variable.

5. The non-transitory computer readable medium of claim 4, wherein the code, when executed by the processor, is further configured to cause the computing device to:
   compare data points representative of the current statuses of the components that operate to affect the control group to predetermined threshold values to assign ranges to the data points;
   store the assigned ranges; and
   display the assigned ranges on the dynamic indicator.

6. The non-transitory computer readable medium of claim 5, wherein the code, when executed by the processor, is further configured to cause the computing device to:
   compare the data points to predetermined threshold values to assign colors associated with the assigned ranges to the data points;
   store the assigned colors; and
   display the assigned colors on the dynamic indicator.

7. The non-transitory computer readable medium of claim 1, wherein the code, when executed by the processor, is further configured to cause the computing device to generate an interface option for allowing a user to reverse the temporal order in which the obtained current statuses are displayed.

8. A method for controlling a building management system, the method comprising:
   displaying on a screen a menu listing one or more selectable pages corresponding to one or more building equipment components of a building management system (BMS); and
   displaying on the screen a selectable control group page that can be reached directly from the menu;

wherein the control group page displays a limited list of data offered within the one or more selectable pages corresponding to one or more components of the BMS, the data in the list being selectable to launch the respective page corresponding to the component of the BMS;

wherein the limited list of data offered within the control group page comprises data points indicating current statuses of only those building equipment components of the BMS that operate to affect the control group, the data points being presented in a temporal order in which the building equipment components operate to affect the control group; and wherein the control group page is displayed while the one or more selectable pages corresponding to one or more building equipment components of the BMS are in an unlaunched state.

9. The method of claim 8, further comprising generating trend graphics for trend data relevant to the control group of the selected control group page prior to the trend graphics being requested by a user.

10. The method of claim 8, further comprising displaying a process variable associated with the control group of the selected control group and at least one of: one or more setpoints, a warning, and an alarm.

11. The method of claim 10, further comprising displaying a dynamic indicator of the process variable.

12. The method of claim 11, further comprising:
comparing data points representative of the current statuses of the components that operate to affect the control group to predetermined threshold values to assign ranges to the data points;
storing the assigned ranges; and
displaying the assigned ranges on the dynamic indicator.

13. The method of claim 12, further comprising:
comparing the data points to predetermined threshold values to assign colors associated with the assigned ranges to the data points;
storing the assigned colors; and
displaying the assigned colors on the dynamic indicator.

14. The method of claim 8, further comprising generating an interface option for allowing a user to reverse the temporal order in which the obtained current statuses are displayed.

15. A controller in a building management system, wherein the controller is configured to:
display on a screen a menu listing one or more selectable pages corresponding to one or more building equipment components of a building management system (BMS); and
display on the screen a selectable control group page that can be reached directly from the menu;
wherein the control group page displays a limited list of data offered within the one or more selectable pages corresponding to one or more components of the BMS, the data in the list being selectable to launch the respective page corresponding to the component of the BMS;
wherein the limited list of data offered within the control group page comprises data points indicating current statuses of only those building equipment components of the BMS that operate to affect the control group, the data points being presented in a temporal order in which the building equipment components operate to affect the control group; and
wherein the control group page is displayed while the one or more selectable pages corresponding to one or more building equipment components of the BMS are in an unlaunched state.

16. The controller of claim 15, wherein the controller is further configured to generate trend graphics for trend data relevant to the control group of the selected control group page prior to the trend graphics being requested by a user.

17. The controller of claim 15, wherein the controller is further configured to display on the screen a process variable associated with the control group of the selected control group page and at least one of: one or more setpoints, a warning, and an alarm.

18. The controller of claim 17, wherein the controller is further configured to display on the screen an interface option for allowing a user to reverse the temporal order in which the obtained data points are displayed.

19. A building management system comprising:
a plurality of building equipment components that operate to affect a variable state or condition within a building indicated by a process variable; and
a controller configured to:
display on a screen a menu listing one or more selectable pages corresponding to one or more of the building equipment components; and
display on the screen a selectable control group page that can be reached directly from the menu;
wherein the control group page displays a limited list of data offered within the one or more selectable pages corresponding to one or more of the building equipment components, the data in the list being selectable to launch the respective page corresponding to the building equipment component;
wherein the limited list of data offered within the control group page comprises data points indicating current statuses of only those building equipment components that operate to affect the control group, the data points being presented in a temporal order in which the building equipment components operate to affect the control group; and
wherein the control group page is displayed while the one or more selectable pages corresponding to one or more building equipment components are in an unlaunched state.

20. The building management system of claim 19, wherein the controller is further configured to generate trend graphics for trend data relevant to the control group of the selected control group page prior to the trend graphics being requested by a user.

21. The building management system of claim 19, wherein the controller is further configured to display on the screen a process variable associated with the control group of the selected control group page and at least one of: one or more setpoints, a warning, and an alarm.

* * * * *